United States Patent
Merlin et al.

(10) Patent No.: US 11,805,438 B2
(45) Date of Patent: *Oct. 31, 2023

(54) TECHNIQUES FOR CONTROLLING A NETWORK

(71) Applicant: QUALCOMM Incorporated, San Diego, CA (US)

(72) Inventors: Simone Merlin, San Diego, CA (US); Yanjun Sun, San Diego, CA (US); Hemanth Sampath, San Diego, CA (US); Bibhu Mohanty, Del Mar, CA (US); Brian Michael Buesker, San Diego, CA (US); Yuan Zhou, San Diego, CA (US); Eric Vanbuhler, San Diego, CA (US); Danyang Cong, San Diego, CA (US); Raamkumar Balamurthi, San Diego, CA (US); Harshit Joshi, San Diego, CA (US); Vamsi Vegunta, San Diego, CA (US); Danny Jen, San Diego, CA (US); Nitin Ravinder, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/746,695

(22) Filed: May 17, 2022

(65) Prior Publication Data

US 2022/0295339 A1  Sep. 15, 2022

Related U.S. Application Data

(63) Continuation of application No. 16/567,415, filed on Sep. 11, 2019, now Pat. No. 11,343,702.

(Continued)

(51) Int. Cl.
*H04W 28/02* (2009.01)
*H04W 8/24* (2009.01)
(Continued)

(52) U.S. Cl.
CPC ....... *H04W 28/0268* (2013.01); *H04L 5/0082* (2013.01); *H04W 8/245* (2013.01); *H04W 74/0808* (2013.01)

(58) Field of Classification Search
CPC ..... H04L 5/0082; H04L 5/0035; H04L 5/006; H04W 28/0268; H04W 74/0808; H04W 8/245; H04W 24/02; H04W 88/12
See application file for complete search history.

(56) References Cited

U.S. PATENT DOCUMENTS 11,343,702 B2 * 5/2022 Merlin ................. H04W 8/245
2009/0109847 A1 4/2009 Stephenson et al.
(Continued)

*Primary Examiner* — Derrick V Rose
(74) *Attorney, Agent, or Firm* — Holland & Hart LLP/Qualcomm

(57) ABSTRACT

This disclosure describes systems, devices, apparatus, and methods, including computer programs encoded on storage media, for controlling a network with one or more access points (APs). A controller may be configured to schedule at least some resources of the one or more APs to improve network efficiency. The APs may measure and report a variety of information and statistics to the controller. The controller may determine one or more transmission parameters and one or more operations a given AP is permitted to perform during a respective time interval. The controller may communicate the one or more transmission parameters using an indication, such as a message. At least one AP associated with the controller may communicate with stations (STAs) using the one or more transmission parameters.

30 Claims, 22 Drawing Sheets

Related U.S. Application Data

(60) Provisional application No. 62/743,252, filed on Oct. 9, 2018.

(51) Int. Cl.
  *H04L 5/00* (2006.01)
  *H04W 74/08* (2009.01)

(56) References Cited

U.S. PATENT DOCUMENTS

| | | |
|---|---|---|
| 2009/0279521 A1 | 11/2009 | Ikeda |
| 2012/0147868 A1 | 6/2012 | Williams et al. |
| 2017/0272317 A1* | 9/2017 | Singla .................. H04W 12/06 |
| 2018/0212827 A1* | 7/2018 | Eryigit .............. H04W 28/0252 |
| 2018/0376360 A1* | 12/2018 | Halabian ............. H04W 72/542 |
| 2019/0215704 A1* | 7/2019 | Thubert ................ H04W 24/02 |
| 2020/0112871 A1 | 4/2020 | Merlin et al. |

* cited by examiner

TECHNIQUES FOR CONTROLLING A NETWORK

CROSS REFERENCE

The present application for patent is a Continuation of U.S. patent application Ser. No. 16/567,415 by MERLIN et al., entitled "TECHNIQUES FOR CONTROLLING A NETWORK" filed Sep. 11, 2019, which claims the benefit of U.S. Provisional Patent Application No. 62/743,252 by MERLIN et al., entitled "TECHNIQUES FOR CONTROLLING A NETWORK," filed Oct. 9, 2018, assigned to the assignee hereof, and expressly incorporated by reference herein.

TECHNICAL FIELD

This disclosure relates generally to wireless communications, and more specifically, to techniques for controlling a network.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the 802.11 family of standards is a Basic Service Set (BSS), which is managed by an AP. Each BSS is identified by a service set identifier (SSID) that is advertised by the AP. An AP periodically broadcasts beacon frames to enable any STAs within wireless range of the AP to establish or maintain a communication link with the WLAN. In a typical WLAN, each STA may be associated with only one AP at a time. To identify an AP with which to associate, a STA is configured to perform scans on the wireless channels of each of one or more frequency bands (for example, the 2.4 GHz band, the 5 GHz band, or both). As a result of the increasing ubiquity of wireless networks, a STA may have the opportunity to select one of many WLANs within range of the STA or select among multiple APs that together form an extended BSS. After association with an AP, an STA may additionally or alternatively be configured to periodically scan its surroundings to find a more suitable AP with which to associate. For example, a STA that is moving relative to its associated AP may perform a "roaming" scan to find an AP having more desirable network characteristics such as a greater received signal strength indicator (RSSI).

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and space). The AP may be coupled to a network, such as the Internet, and may enable a station to communicate via the network including communicating with other devices coupled to the AP.

SUMMARY

The systems, methods and devices of this disclosure each have several innovative aspects, no single one of which is solely responsible for the desirable attributes disclosed herein.

A method of wireless communication is described. The method may include receiving information from one or more access points, determining one or more transmission parameters and one or more operations that at least one access point of the one or more access points is permitted to perform during a respective time interval based on the information, and transmitting at least one message to at least one of the one or more access points, the message indicating the one or more operations that at least one of the access points is permitted to perform.

An apparatus for wireless communication is described. The apparatus may include a processor, memory in electronic communication with the processor, and instructions stored in the memory. The instructions may be executable by the processor to cause the apparatus to receive information from one or more access points, determine one or more transmission parameters and one or more operations that at least one access point of the one or more access points is permitted to perform during a respective time interval based on the information, and transmit at least one message to at least one of the one or more access points, the message indicating the one or more operations that at least one of the access points is permitted to perform.

Another apparatus for wireless communication is described. The apparatus may include means for receiving information from one or more access points, determining one or more transmission parameters and one or more operations that at least one access point of the one or more access points is permitted to perform during a respective time interval based on the information, and transmitting at least one message to at least one of the one or more access points, the message indicating the one or more operations that at least one of the access points is permitted to perform.

A non-transitory computer-readable medium storing code for wireless communication is described. The code may include instructions executable by a processor to receive information from one or more access points, determine one or more transmission parameters and one or more operations that at least one access point of the one or more access points is permitted to perform during a respective time interval based on the information, and transmit at least one message to at least one of the one or more access points, the message indicating the one or more operations that at least one of the access points is permitted to perform.

In some examples of the method, apparatuses, and non-transitory computer-readable medium described herein, determining time intervals to be used by at least one of the one or more access points to communicate with one or more stations based on the information from the one or more access points, where the one or more transmission parameters are associated with each time interval, the one or more transmission parameters associated with each time interval defining, for the respective time interval, one or more operations that at least one access point of the one or more access points is permitted to perform during the respective time interval.

In some examples of the method, apparatuses, and non-transitory computer-readable medium described herein, receiving the information from the one or more access points may include operations, features, means, or instructions for receiving statistics for a first group of stations associated with a first access point of the one or more access points and a second group of stations that may be not associated with the first access point, where determining the time intervals or determining the one or more transmission parameters associated with each time interval may be based on receiving the statistics about the first group of stations and the second group of stations from the first access point.

Some examples of the method, apparatuses, and non-transitory computer-readable medium described herein may additionally or alternatively include operations, features, means, or instructions for determining a type of a time interval, where determining the one or more transmission parameters may be based on determining the type of the time interval.

In some examples of the method, apparatuses, and non-transitory computer-readable medium described herein, the type of the time interval includes an arrangement of transmission parameters for the time interval.

In some examples of the method, apparatuses, and non-transitory computer-readable medium described herein, the type of the time interval includes one or more of an AP-time type, a silent type, and one or more other types.

In some examples of the method, apparatuses, and non-transitory computer-readable medium described herein, the AP-time type indicates that the at least one access point may serve any station associated with the at least one access point during the time interval.

In some examples of the method, apparatuses, and non-transitory computer-readable medium described herein, the silent type indicates that the at least one access point does not transmit data packets during the time interval.

In some examples of the method, apparatuses, and non-transitory computer-readable medium described herein, the one or more other types indicate that the at least one access point may be configured to transmit selected types of frames during the time interval.

Some examples of the method, apparatuses, and non-transitory computer-readable medium described herein may additionally or alternatively include operations, features, means, or instructions for transmitting at least one request to at least one of the one or more access points to collect the information, where receiving the information may be based on transmitting the at least one request.

In some examples of the method, apparatuses, and non-transitory computer-readable medium described herein, the information received from the one or more access points includes statistics about communication links between at least some of the one or more access points and the one or more stations.

In some examples of the method, apparatuses, and non-transitory computer-readable medium described herein, the information received from the one or more access points includes association and capabilities information per associated station.

In some examples of the method, apparatuses, and non-transitory computer-readable medium described herein, the information received from the one or more access points includes an indicator of an amount of pending traffic for at least one station of the one or more stations.

In some examples of the method, apparatuses, and non-transitory computer-readable medium described herein, the amount of pending traffic included in the indicator may be indicated per one or more of a quality of service (QoS) category, or an access category (AC), or a traffic identifier (TID) of the pending traffic.

In some examples of the method, apparatuses, and non-transitory computer-readable medium described herein, the information received from the one or more access points includes one or more signal quality indicators associated with a communication link between a first access point and a station.

In some examples of the method, apparatuses, and non-transitory computer-readable medium described herein, the station may be associated with the first access point.

In some examples of the method, apparatuses, and non-transitory computer-readable medium described herein, the station may be not associated with the first access point.

In some examples of the method, apparatuses, and non-transitory computer-readable medium described herein, the station may be one of the stations indicated in a tracked list that may be communicated in the at least one message.

In some examples of the method, apparatuses, and non-transitory computer-readable medium described herein, the information received from the one or more access points includes a beacon report about beacons received from other access points.

In some examples of the method, apparatuses, and non-transitory computer-readable medium described herein, the information received from the one or more access points includes a power state of a station.

In some examples of the method, apparatuses, and non-transitory computer-readable medium described herein, the one or more transmission parameters include one or more of instructions to cause at least one of the one or more access points to communicate with stations associated with the at least one of the one or more access points, a request-to-send configuration, a clear-to-send configuration, or an indication of a rate adaptation configuration.

In some examples of the method, apparatuses, and non-transitory computer-readable medium described herein, the transmit parameters include one or more clear channel assessment (CCA) configuration parameters, one or more backoff parameters, one or more enhanced distributed coordination function (DCF) channel access (EDCA) parameters, one or more energy detection threshold parameters, one or more delay acknowledgement parameters, or one or more request-to-send (RTS) parameters.

Some examples of the method, apparatuses, and non-transitory computer-readable medium described herein may additionally or alternatively include operations, features, means, or instructions for identifying, for at least one of the time intervals, a device such as a station to communicate with a first access point of the one or more access points during the time interval, where the one or more transmission parameters indicate that the first access point may be permitted to communicate with the station during the time interval.

Some examples of the method, apparatuses, and non-transitory computer-readable medium described herein may additionally or alternatively include operations, features, means, or instructions for determining, for at least one of the time intervals, that a first access point of the one or more access points may be permitted to communicate during the time interval with a group of stations, where the one or more transmission parameters indicate that the first access point may be permitted to communicate during the time interval with the group of stations.

Some examples of the method, apparatuses, and non-transitory computer-readable medium described herein may additionally or alternatively include operations, features, means, or instructions for determining, for at least one of the time intervals, identifiers of stations that a first access point of the one or more access points may be permitted to communicate with during the time interval, where the at least one message includes the identifiers.

Some examples of the method, apparatuses, and non-transitory computer-readable medium described herein may additionally or alternatively include operations, features, means, or instructions for determining conditions of communication links between the one or more access points and the one or more stations based on receiving the information from the one or more access points, where determining the one or more transmission parameters may be based on determining the conditions of the communication links.

In some examples of the method, apparatuses, and non-transitory computer-readable medium described herein, a first access point may be configured to receive uplink signals from a first group of stations during a first time interval and a second access point may be configured to receive uplink signals from a second group of stations during the first time interval.

Some examples of the method, apparatuses, and non-transitory computer-readable medium described herein may additionally or alternatively include operations, features, means, or instructions for determining whether the time interval may be associated with an uplink signal or a downlink signal, where the at least one message includes an indication of whether the time interval may be associated with the uplink signal or with the downlink signal.

Some examples of the method, apparatuses, and non-transitory computer-readable medium described herein may additionally or alternatively include operations, features, means, or instructions for exchanging configuration information or diagnostic information associated with the one or more access points with a cloud controller, where determining the time intervals or determining the one or more transmission parameters associated with each time interval may be based on exchanging the configuration information or the diagnostic information with the cloud controller.

In some examples of the method, apparatuses, and non-transitory computer-readable medium described herein, a controller may be configured to transmit the at least one message to the one or more access points.

In some examples of the method, apparatuses, and non-transitory computer-readable medium described herein, one of the one or more access points includes the controller.

In some examples of the method, apparatuses, and non-transitory computer-readable medium described herein, a control loop of the controller may be at least partially executed by a server different than the one or more access points.

In some examples of the method, apparatuses, and non-transitory computer-readable medium described herein, identifying information about an access point or a group of stations associated with the access point, transmitting the information to a controller configured to control a set of access points that includes the access point, receiving at least one message from the controller that includes one or more transmission parameters defining one or more operations that at least one of the access points is permitted to perform, and determining one or more transmission parameters for the information transmitted to the controller.

An apparatus for wireless communication is described. The apparatus may include a processor, memory in electronic communication with the processor, and instructions stored in the memory. The instructions may be executable by the processor to cause the apparatus to identify information about an access point or a group of stations associated with the access point, transmit the information to a controller configured to control a set of access points that include the access point, receive at least one message from the controller that includes one or more transmission parameters defining one or more operations that at least one of the access points is permitted to perform, and determine one or more transmission parameters for the information transmitted to the controller.

Another apparatus for wireless communication is described. The apparatus may include means for identifying information about an access point or a group of stations associated with the access point, transmitting the information to a controller configured to control a set of access points that includes the access point, receiving at least one message from the controller that includes one or more transmission parameters defining one or more operations that at least one of the access points is permitted to perform, and determine one or more transmission parameters for the information transmitted to the controller.

A non-transitory computer-readable medium storing code for wireless communication is described. The code may include instructions executable by a processor to identify information about an access point or a group of stations associated with the access point, transmit the information to a controller configured to control a set of access points that includes the access point, receive at least one message from the controller that includes one or more transmission parameters defining one or more operations that at least one of the access points is permitted to perform, and determine one or more transmission parameters for the information transmitted to the controller.

In some examples of the method, apparatuses, and non-transitory computer-readable medium described herein, performing at least one of the one or more operations includes communicating with at least one station of the group of stations based on the respective one or more transmission parameters.

In some examples of the method, apparatuses, and non-transitory computer-readable medium described herein, receiving the at least one message from the controller that includes time intervals for the access point to communicate with the group of stations and one or more transmission parameters associated with each time interval, the one or more transmission parameters defining, for the respective time interval, one or more operations that the access point is permitted to perform during the respective time interval.

In some examples of the method, apparatuses, and non-transitory computer-readable medium described herein, the group of stations includes stations that may have an established communication link with the access point, where the access point may be permitted to communicate with the stations during the at least one time interval.

Some examples of the method, apparatuses, and non-transitory computer-readable medium described herein may additionally or alternatively include operations, features, means, or instructions for determining identifiers of stations that the access point may be permitted to communicate with during the at least one time interval based on receiving the at least one message, where communicating with the group of stations during the at least one time interval may be based on the identifiers.

Some examples of the method, apparatuses, and non-transitory computer-readable medium described herein may additionally or alternatively include operations, features, means, or instructions for identifying statistics about stations that may have an established communication link with the access point, where the information transmitted to the controller includes the statistics.

Some examples of the method, apparatuses, and non-transitory computer-readable medium described herein may additionally or alternatively include operations, features, means, or instructions for identifying statistics about stations that do not may have an established communication link with the access point, where the information transmitted to the controller includes the statistics.

Some examples of the method, apparatuses, and non-transitory computer-readable medium described herein may additionally or alternatively include operations, features, means, or instructions for identifying statistics about other access points, where the information transmitted to the controller includes the statistics about the other access points.

In some examples of the method, apparatuses, and non-transitory computer-readable medium described herein, the information transmitted to the controller includes statistics about a first group of stations associated with the access point and a second group of stations that may be not associated with the access point.

In some examples of the method, apparatuses, and non-transitory computer-readable medium described herein, the information transmitted to the controller includes an indicator of traffic pending for at least one station of the group of stations.

In some examples of the method, apparatuses, and non-transitory computer-readable medium described herein, the information transmitted to the controller includes one or more of a list of stations tracked by the access point, a signal quality indicator associated with a communication link between the access point and a station, a beacon report about beacons received from other access points, client statistics, basic service set (BSS) statistics, or a power state of the station.

In some examples of the method, apparatuses, and non-transitory computer-readable medium described herein, the one or more transmission parameters include one or more of instructions to the access point to cause the access point to communicate with stations associated with the access point, a modification to a schedule associated with the access point, a request-to-send configuration, a clear-to-send configuration, an indication of a rate adaptation configuration.

Some examples of the method, apparatuses, and non-transitory computer-readable medium described herein may additionally or alternatively include operations, features, means, or instructions for receiving at least one request to collect the information about the access point, where identifying the information may be based on receiving the at least one request.

In some examples of the method, apparatuses, and non-transitory computer-readable medium described herein, communicating with the group of stations may include operations, features, means, or instructions for receiving uplink signals from the group of stations during the at least one time interval.

In some examples of the method, apparatuses, and non-transitory computer-readable medium described herein, the access point includes at least a portion of the controller.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
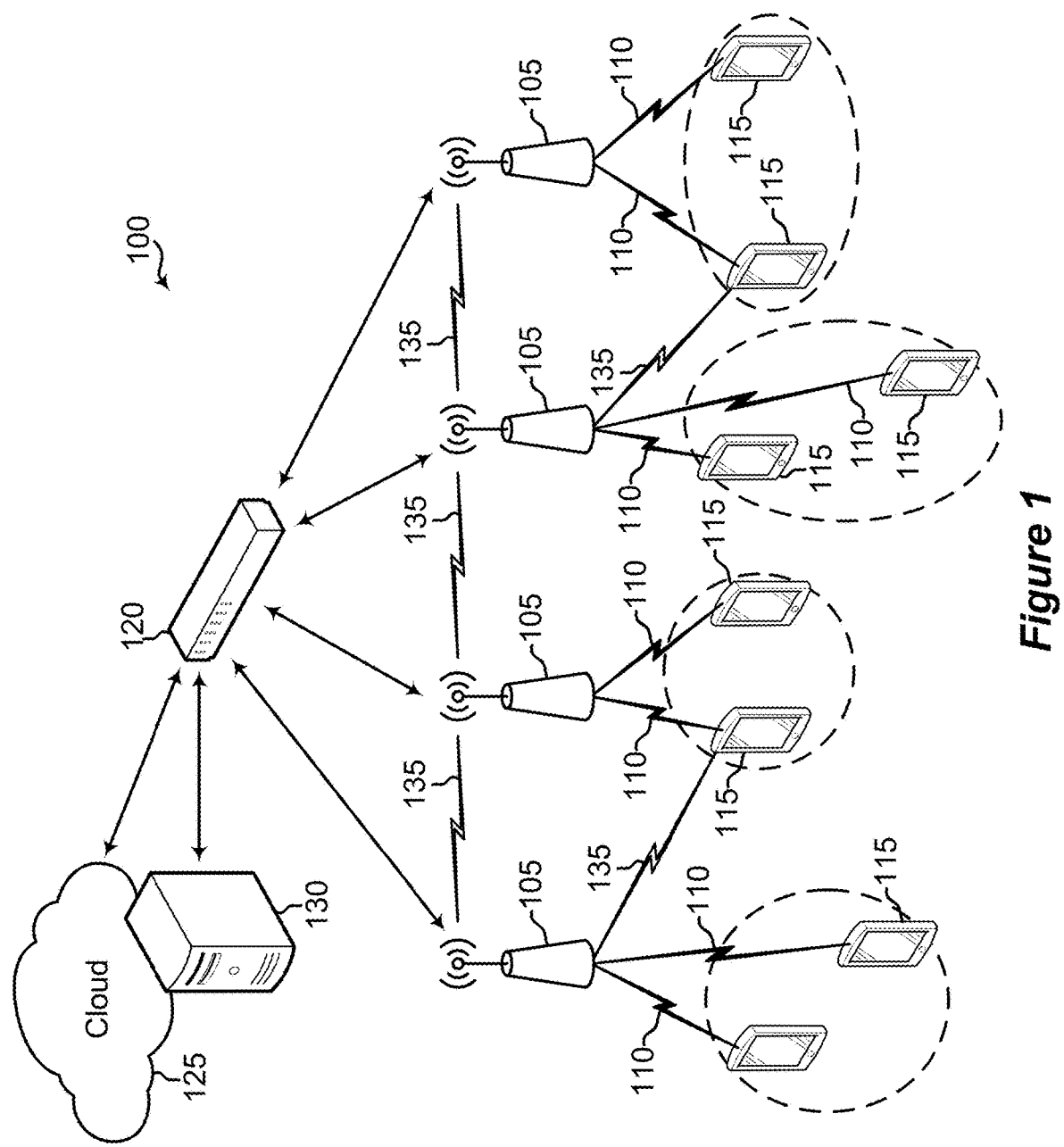
FIG. 1 shows a block diagram of an example wireless communication system for use in wireless communication.

The following description is directed to specific implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to any of the Institute of Electrical and Electronics Engineers (IEEE) 802.11 standards, or the Bluetooth® standards. The described implementations may additionally or alternatively be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet-of-things (IOT) network, such as a system utilizing 3G, 4G or 5G, or further implementations thereof, technology.

Some wireless communication systems may include a network of multiple access points (APs) deployed at a given location. The APs may cooperate to provide coverage to the location. In some deployments of a network, the coverage areas of the APs may overlap resulting in interference as well as situations in which multiple APs can service one station (STA). In some wireless communication systems, the execution of some operations may be determined by the STA.

Techniques for controlling a network with multiple APs are described herein. A first device, such as a controller, may be configured to schedule at least some resources of multiple APs to improve network efficiency. The APs may measure and report a variety of information and statistics to the controller. The controller may determine time intervals for the APs to perform functions. The controller may additionally or alternatively determine one or more transmission parameters associated with each time interval defining what operations a given AP is permitted to perform during the respective time interval. The controller may optionally communicate the time intervals and the one or more transmission parameters using a message. The APs associated with the controller may optionally communicate with STAs using the time intervals based on the one or more transmission parameters.

Various implementations relate generally to wireless communications. Some implementations more specifically relate to controlling a network with multiple APs using time intervals and transmission parameters. Particular implementations of the subject matter described in this disclosure can be implemented to realize one or more of the following potential advantages. In some implementations, the described techniques can be used to define time intervals and transmission parameters associated with the time intervals to schedule resources and to improve network efficiency.

FIG. 1 shows a block diagram of an example wireless communication system 100. According to some aspects, the wireless communication system 100 can include aspects of a wireless local area network (WLAN). For example, the wireless communication system 100 can be a network implementing at least one of the IEEE 802.11 family of standards. The wireless communication system 100 may include numerous wireless devices including multiple APs 105 and multiple associated STAs 115.

The wireless communication system 100 may be deployed at a location, such as a home or business. In such deployments, the wireless communication system 100 may include a router, one or more switches, or both (hereinafter router/switch 120). The router/switch 120 may be configured to connect an outside network (for example, the internet or the cloud 125) with the wireless communication system 100. The router/switch 120 may enable the APs 105 and STAs 115 of the network to share a connection to the cloud or the internet. The router/switch 120 may include a wide-area network (WAN) port that may be coupled with the cloud 125 and one or more local area network (LAN) ports that may be coupled with one or more APs 105 or STAs 115. The router/switch 120 may act as a controller of the network and enable the devices of the network to communicate with one another.

The cloud 125 may be an example of any external WAN, including the internet or a core network. The cloud 125 may include one or more servers, computing devices, or databases to perform the functions described herein.

In some wireless communication systems 100, the router/switch 120 may coordinate the traffic of the entire network. If the wireless communication system 100 includes multiple access points, the router/switch 120 may not be configured to coordinate the actions of the multiple APs 105. In such circumstances, the APs 105 may interfere with each other, compete needlessly for available resources, or experience other issues that may adversely impact network performance or throughput.

The wireless communication system 100 may include a controller 130 configured to coordinate the operations of one or more APs 105 deployed at a location in the same network that may be managed by the router/switch 120. The controller 130 may be an example of software or firmware implemented on one or more devices to perform the functions described herein. In some examples, the controller 130 may be implemented using devices of the cloud 125. In some examples, the controller 130 may be implemented by the router/switch 120 or one of the APs 105 of the wireless communication system 100. In some examples, the controller 130 may be implemented by any combination of devices of the cloud 125, the router/switch 120, one or more APs 105, or other computing device with a communicative connection with the wireless communication system 100. The controller 130 may be communicatively coupled with the APs 105 using wired communication links, wireless communication links, or a combination thereof, for example, using the router/switch 120.

Each of the STAs 115 may additionally or alternatively be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), printers, key fobs (for example, for passive keyless entry and start (PKES) systems), among other possibilities.

Each of the STAs 115 may associate and communicate with the AP 105 via a communication link 110. The various STAs 115 in the network are able to communicate with one another through the AP 105. A single AP 105 and an associated set of STAs 115 may be referred to as a basic service set (BSS). Coverage areas of the APs 105 may represent a basic service area (BSA) of the wireless communication system 100. While only one AP 105 is shown, the wireless communication system 100 can include multiple APs 105. An extended service set (ESS) may include a set of connected BSSs. An extended network station associated with the wireless communication system 100 may be coupled with a wired or wireless distribution system that may allow multiple APs 105 to be connected in such an ESS. As such, a STA 115 can be covered by more than one AP 105 and can associate with different APs 105 at different times for different transmissions.

STAs 115 may function and communicate (via the respective communication links 110) according to the IEEE 802.11 family of standards and amendments including, but not limited to, 802.11a, 802.11b, 802.11g, 802.11n, 802.11ac, 802.11ad, 802.11ah, 802.11ay, 802.11ax, 802.11az, and 802.11ba. These standards define the wireless communication system radio and baseband protocols for the physical (PHY) layer and medium access control (MAC) layer. The wireless devices in the wireless communication system 100 may communicate over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. The unlicensed spectrum may also include other frequency bands, such as the emerging 6 GHz band. The wireless devices in the wireless communication system 100 may additionally or alternatively be configured to communicate over other frequency bands such as shared licensed frequency bands, where multiple operators may have a license to operate in the same or overlapping frequency band or bands.

In some examples, STAs 115 may form networks without APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some examples, ad hoc networks may be implemented within a larger wireless network such as the wireless communication system 100. In such implementations, while the STAs 115 may be capable of communicating with each other through the AP 105 using communication links 110, STAs 115 also can communicate directly with each other via direct wireless communication links. Additionally, two STAs 115 may communicate via a direct communication link regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless communication links include Wi-Fi Direct connections, connections established by using a Wi-Fi Tunneled Direct Link Setup (TDLS) link, and other peer-to-peer (P2P) group connections.

Some types of STAs 115 may provide for automated communication. Automated wireless devices may include those implementing IoT communication, Machine-to-Machine (M2M) communication, or machine type communication (MTC). IoT, M2M or MTC may refer to data communication technologies that allow devices to communicate without human intervention. For example, IoT, M2M or MTC may refer to communications from STAs 115 that integrate sensors or meters to measure or capture information and relay that information to a central server or application program that can make use of the information or present the information to humans interacting with the program or application.

Some of STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may additionally or alternatively be configured to enter a power saving "deep sleep" mode when not engaging in active communications.

Wireless communication system 100 may support beamformed transmissions. As an example, AP 105 may use multiple antennas or antenna arrays to conduct beamforming operations for directional communications with a STA 115. Beamforming (which may additionally or alternatively be referred to as spatial filtering or directional transmission) is a signal processing technique that may be used at a transmitter (for example, AP 105) to shape or steer an overall antenna beam in the direction of a target receiver (for example, a STA 115). Beamforming may be achieved by combining elements in an antenna array in such a way that transmitted signals at particular angles experience constructive interference while others experience destructive interference. In some examples, the ways in which the elements of the antenna array are combined at the transmitter may depend on channel state information (CSI) associated with the channels over which the AP 105 may communicate with the STA 115. That is, based on this CSI, the AP 105 may appropriately weight the transmissions from each antenna (for example, or antenna port) such that the desired beamforming effects are achieved. In some examples, these weights may be determined before beamforming can be employed. For example, the transmitter (for example, the AP 105) may transmit one or more sounding packets to the receiver in order to determine CSI.

Wireless communication system 100 may additionally or alternatively support multiple-input, multiple-output (MIMO) wireless systems. Such systems may use a transmission scheme between a transmitter (for example, AP 105) and a receiver (for example, a STA 115), where both transmitter and receiver are equipped with multiple antennas. For example, AP 105 may have an antenna array with a number of rows and columns of antenna ports that the AP 105 may use for beamforming in its communication with a STA 115. Signals may be transmitted multiple times in different directions (for example, each transmission may be beamformed differently). The receiver (for example, STA 115) may try multiple beams (for example, antenna subarrays) while receiving the signals.

Wireless communication system 100 may additionally or alternatively support using one or more APs 105 to establish a coverage area at a location. The multiple APs 105 may be used to provide network access to a set of STAs 115. In some examples, the plurality of APs 105 may exchange information through wireless communication links or through the router/switch 120. The information may be exchanged between APs 105 and the controller.

In some examples, one or more STAs 115 may be associated with an AP 105. When a STA 115 is associated with the AP 105, a communication link 110 is established between the AP 105 and the STA 115. In environments where multiple APs 105 service a given location, STAs 115 may be associated with APs 105 to manage network traffic. In some examples, an AP 105 may receive signals from non-associated STAs 115. For example, an AP 105 may receive signals (represented by communication links 135) from one or more non-associated STAs 115, one or more other APs 105, other devices, or any combination thereof.

PDUs of the wireless communication system may be transmitted over a radio frequency spectrum band, which in some examples may include multiple sub-bands or frequency channels. In some examples, the radio frequency spectrum band may have a bandwidth of 80 MHz, and each of the sub-bands or channels may have a bandwidth of 20 MHz. Transmissions to and from STAs 115 and APs 105 typically include control information within a header that is transmitted prior to data transmissions. The information provided in a header is used by a receiving device to decode the subsequent data. A legacy preamble of the wireless communication system may include legacy short training field (STF) (L-STF) information, legacy long training field (L-LTF) information, and legacy signaling (L-SIG) information. The legacy preamble may be used for packet detection, automatic gain control and channel estimation, among other uses. The legacy preamble may additionally or alternatively be used to maintain compatibility with legacy devices.

Figure 2:
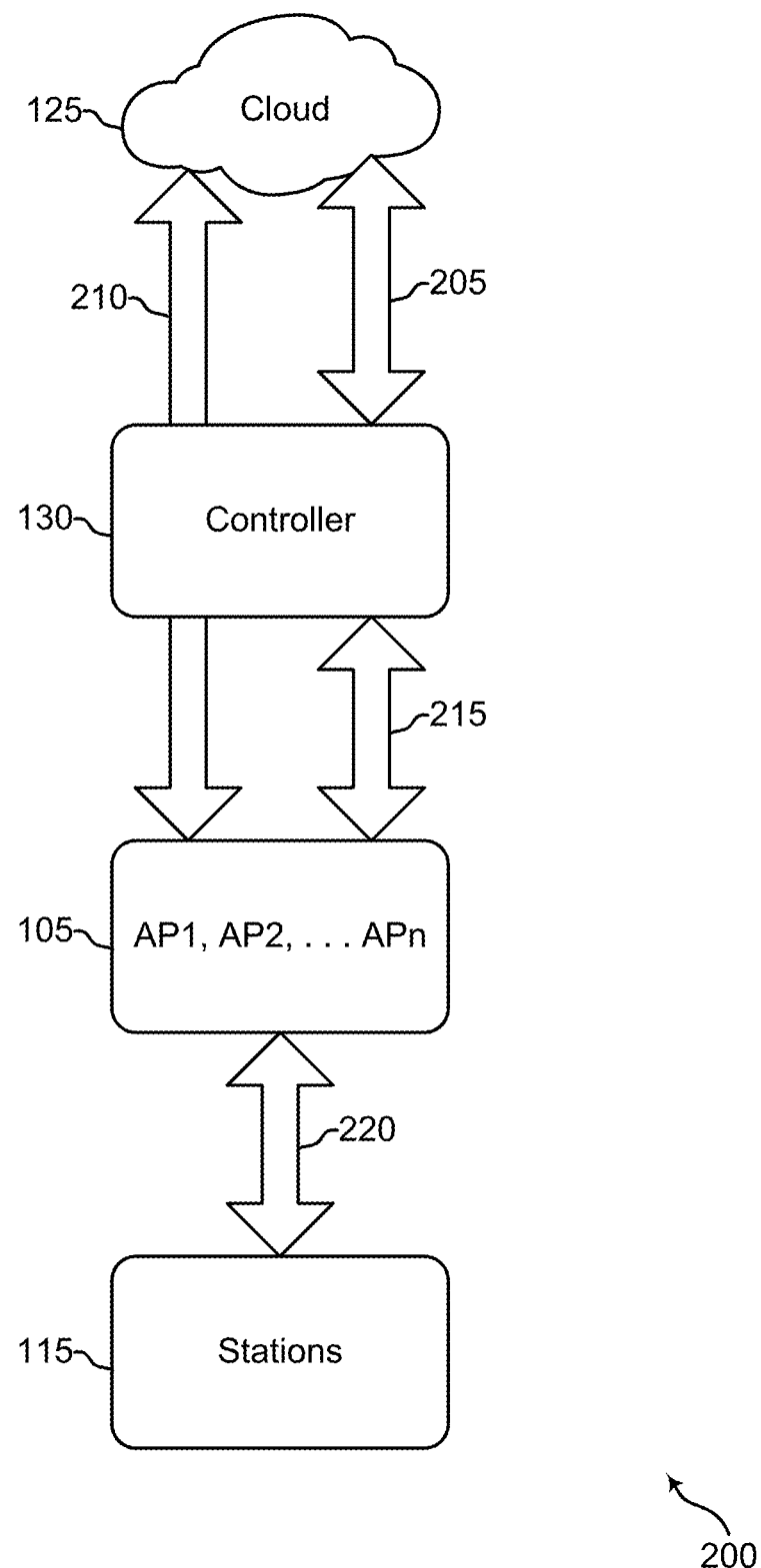
FIG. 2 shows a block diagram of an example of an architecture of a wireless communication system.

FIG. 2 shows an example of an architecture 200 of a wireless communication system (for example, the wireless communication system described with reference to FIG. 1). The architecture 200 may be an example of a logical architecture and each of the components discussed may be implemented by one or more computing devices. For example, the controller 130 may be implemented using a server of the cloud 125, an independent server, one or more APs 105, other computing devices, or any combination thereof. The architecture 200 may include a cloud 125, a controller 130, one or more APs 105, and one or more STAs 115.

The cloud 125 may be configured to configure the network of the wireless communication system by issuing commands to the APs 105 based on information reported by the APs 105 to the cloud 125. The process of reporting information to the cloud 125 and receiving commands from the cloud by the APs 105 may take an amount of time to complete. In some implementations, the controller 130 may be configured to provide faster reporting and faster control than the cloud 125. In some examples, the controller 130 may be an example of an edge server of the cloud 125.

The cloud 125 may be configured to exchange communications 205 with the controller 130 and communications 210 with the one or more APs 105. The communications 205 and 210 may include long-term configuration information, diagnostic information, or both. The controller 130 may be configured to exchange communications 215 with the one or more APs 105. The communications 215 may include low-latency reporting of statistics about the network, low-latency commands, or controls that are configured to provide low-latency scheduling of traffic. In some implementations, the low-latency reporting, low-latency commands, or the low-latency scheduling of traffic may refer to reporting, commands, or scheduling of communications that require low-latency. The one or more APs 105 may exchange communications 220 with the STAs 115. The communications 220 may include management frames (such as beacons, probe requests and probe responses), data frames for both uplink and downlink traffic, interference, noise, other signals, or any combination thereof.

Figure 3A:
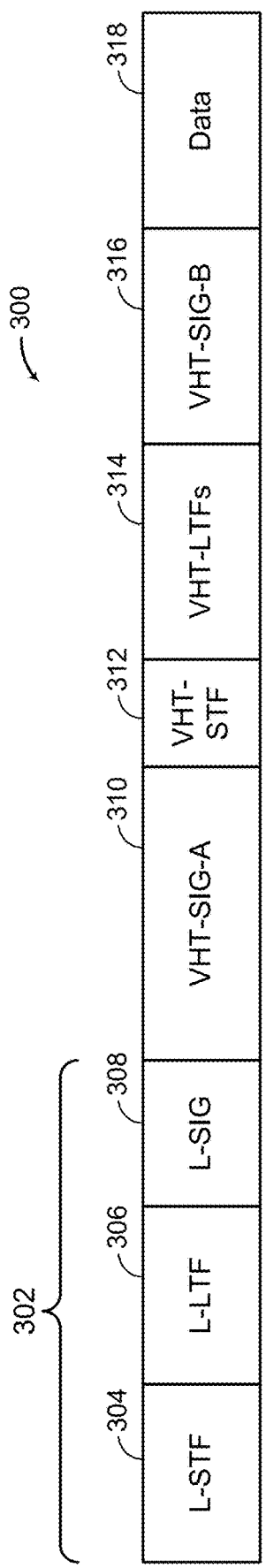
FIG. 3A shows an example frame usable for communications between an access point (AP) and a number of stations (STAs).

FIG. 3A shows an example frame 300 usable for communications between an AP and each of a number of stations identified by the AP or each of a number of stations associated with the AP. For example, the frame 300 can be formatted as a very high throughput (VHT) frame in accordance with the IEEE 802.11ac amendment to the IEEE 802.11 set of standards. The frame 300 includes a legacy preamble portion 302 that includes an L-STF 304, an L-LTF 306, and a legacy signaling field (L-SIG) 308. The frame 300 further includes a non-legacy preamble portion that includes a first VHT signaling field (VHT-SIG-A) 310, a VHT short training field (VHT-STF) 312, a number of VHT long training fields (VHT-LTFs) 314 and a second VHT signaling field (VHT-SIG-B) 316. The frame 300 also can include a payload or data portion 318 after the preamble. The data portion 318 can include MAC protocol data units (MPDUs), for example, in the form of an aggregated MPDU (AMPDU).

The frame 300 may be transmitted over a radio frequency spectrum band, which may include multiple sub-bands. For example, the radio frequency spectrum band may have a bandwidth of 80 MHz, and each of the sub-bands may have a bandwidth of 20 MHz. When the radio frequency spectrum band includes one or more sub-bands, the L-STF, L-LTF, and L-SIG fields 304, 306 and 308, respectively, may be duplicated and transmitted in each of the plurality of sub-bands. The information in the VHT-SIG-A field 310 is also duplicated and transmitted in each sub-band.

The VHT-SIG-A field 310 may indicate to a station that the frame 300 is an IEEE 802.11ac frame. The VHT-SIG-A field 310 also may include VHT signaling information usable by stations other than the number of stations that are identified to receive downlink communications in the frame 300. The VHT-SIG-A field 310 also includes information usable by the identified number of stations to decode the VHT-SIG-B field 316. The VHT-SIG-B field 316 may include VHT signaling information usable by the number of stations identified to receive downlink communications in the frame 300. More specifically, the VHT-SIG-B field 316 may include information usable by the number of stations to decode data received in the data portion 318. The VHT-SIG-B field 316 may be encoded separately from the VHT-SIG-A field 310. The number of VHT-LTFs 314 depends on the number of transmitted streams.

Figure 3B:
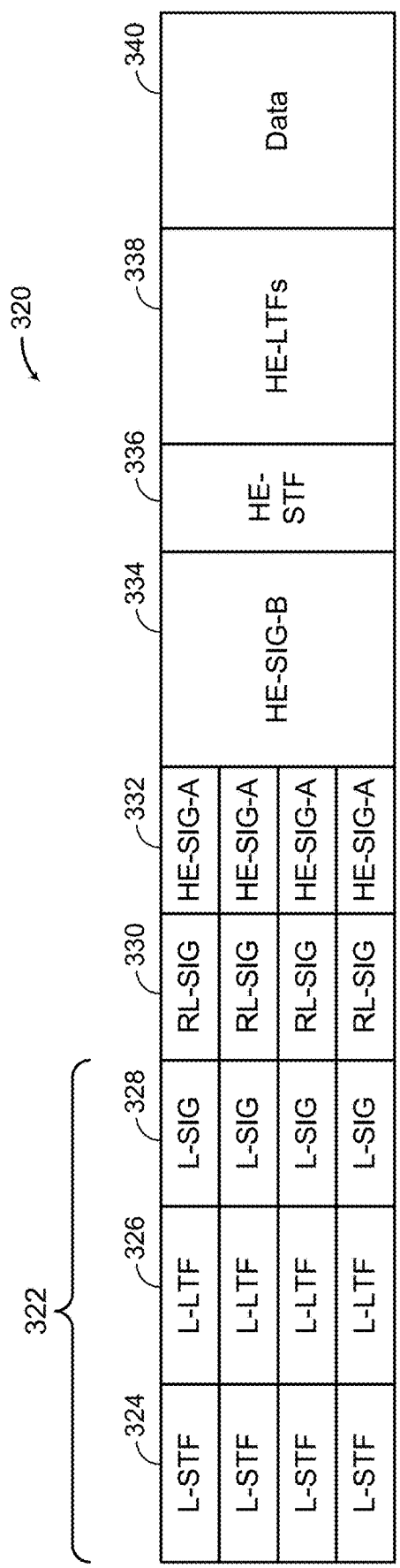
FIG. 3B shows an example frame usable for communications between an AP and a number of STAs.

FIG. 3B shows an example frame 320 usable for communications between an AP and each of a number of stations identified by the AP or each of a number of stations associated with the AP. For example, the frame 320 can be formatted as a high efficiency (HE) frame in accordance with the IEEE 802.11ax amendment to the IEEE 802.11 set of standards. The frame 320 includes a legacy preamble portion 322 that includes an L-STF 324, an L-LTF 326, and an L-SIG 328. The frame 320 further includes a non-legacy preamble portion that includes a repeated legacy signaling field (RL-SIG) 330, a first high efficiency signaling field (HE-SIG-A) 332, a second high efficiency signaling field (HE-SIG-B) 334, a high efficiency short training field (HE-STF) 336 and a number of high efficiency long training fields (HE-LTFs) 338. The frame 320 also can include a payload or data portion 340 after the preamble. The data portion 340 can include MAC protocol data units (MPDUs), for example, in the form of an AMPDU.

The frame 320 may be transmitted over a radio frequency spectrum band, which may include a set of sub-bands. For example, the radio frequency spectrum band may have a bandwidth of 80 MHz, and each of the sub-bands may have a bandwidth of 20 MHz. When the radio frequency spectrum band includes one or more sub-bands, the L-STF, L-LTF, and L-SIG fields 324, 326 and 328, respectively, may be duplicated and transmitted in each of the plurality of sub-bands. The information in the RL-SIG field 330 and the HE-SIG-A field 332 is also duplicated and transmitted in each sub-band as shown in FIG. 3B.

The RL-SIG field 330 may indicate to a station that the frame 320 is an IEEE 802.11ax frame. The HE-SIG-A field 332 may include high efficiency signaling information usable by stations other than the number of stations that are identified to receive downlink communications in the frame 320. The HE-SIG-A field 332 may also include information usable by the identified number of stations to decode the HE-SIG-B field 334. The HE-SIG-B field 334 may include high efficiency signaling information usable by the number of stations identified to receive downlink communications in the frame 320. More specifically, the HE-SIG-B field 334 may include information usable by the number of stations to decode data received in the data portion 340. The HE-SIG-B field 334 may be encoded separately from the HE-SIG-A field 332.

HE WLAN (HEW) preambles can be used to schedule multiple devices, such as STAs 115, for multi-user simultaneous transmissions (for example, using multi-user orthogonal frequency division multiple access (MU-OFDMA) or multi-user multiple-input, multiple-output (MU-MIMO) techniques). A HEW signaling field may be used to signal a resource allocation pattern to multiple receiving STAs 115. The HEW signaling field can include a common user field that is decodable by multiple STAs 115, as well as a resource allocation field. The resource allocation field can indicate resource unit distributions to multiple STAs 115 and indicate which resource units in a resource unit distribution correspond to MU-MIMO transmissions and which resource units correspond to OFDMA transmissions. The HEW signaling field also can include, subsequent to the common user field, dedicated station-specific signaling fields that are assigned to particular STAs 115 and used to schedule resources and to indicate the scheduling to other devices of the wireless communication system.

Figure 4:
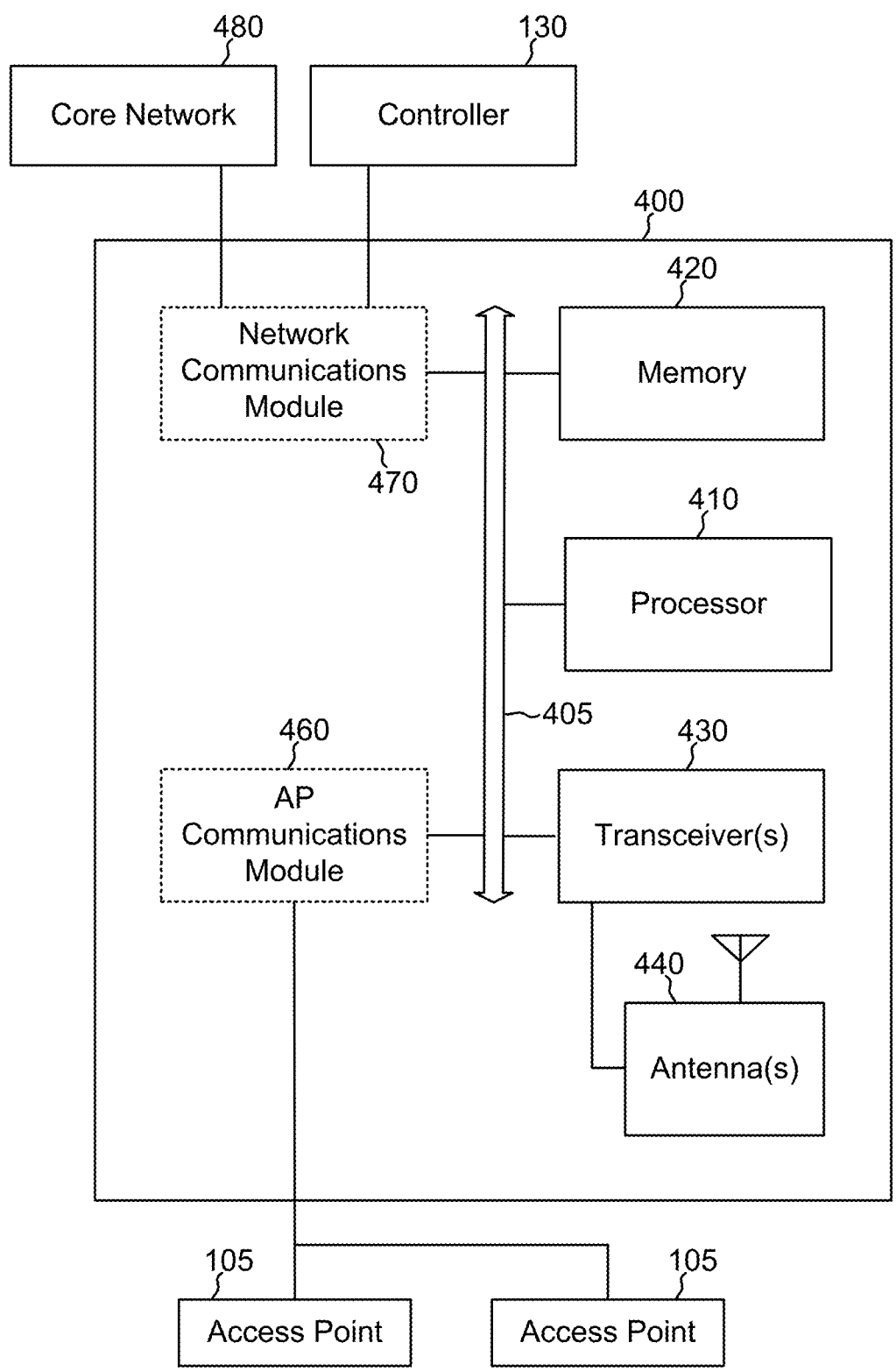
FIG. 4 shows a block diagram of an example AP for use in wireless communication.

FIG. 4 shows a block diagram of an example AP 400 for use in wireless communication. For example, the AP 400 may be an example of aspects of the AP 105 described with reference to FIG. 1. The AP 400 can be configured to send and receive frames (also referred to herein as transmissions or communications) of the wireless communication system conforming to an IEEE 802.11 standard (such as the 802.11ac or 802.11ax amendments to the 802.11 family of standards), as well as to encode and decode such frames. The AP 400 includes a processor 410, a memory 420, at least one transceiver 430 and at least one antenna 440. In some implementations, the AP 400 also includes one or both of an AP communications module 460 and a network communications module 470. Each of the components (or "modules") described with reference to FIG. 4 can communicate with one another, directly or indirectly, over at least one bus 405.

The memory 420 can include random access memory (RAM) and read-only memory (ROM). The memory 420 also can store processor- or computer-executable software code 425 containing instructions that, when executed by the processor 410, cause the processor to perform various functions described herein for wireless communication, including generation and transmission of a downlink frame and reception of an uplink frame.

The processor 410 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 410 processes information received through the transceiver 430, the AP communications module 460, and the network communications module 470. The processor 410 also can process information to be sent to the transceiver 430 for transmission through the antenna 440, information to be sent to the AP communications module 460, and information to be sent to the network communications module 470. The processor 410 can generally be configured to perform various operations related to generating and transmitting a downlink frame and receiving an uplink frame.

The transceiver 430 can include a modem to modulate packets and provide the modulated packets to the antenna 440 for transmission, as well as to demodulate packets received from the antenna 440. The transceiver 430 can be implemented as at least one radio frequency (RF) transmitter and at least one separate RF receiver. The transceiver 430 can communicate bi-directionally, via the antenna 440, with at least one STA 115 as, for example, shown in FIG. 1. Although only one transceiver 430 and one antenna 440 are shown in FIG. 4, the AP 400 can typically include multiple transceivers 430 and antennas 440. For example, in some AP implementations, the AP 400 can include multiple transmit antennas (each with a corresponding transmit chain) and multiple receive antennas (each with a corresponding receive chain). The AP 400 may communicate with a core network 480 (including the cloud 125, the controller 130, or both) through the network communications module 470. The system also may communicate with other APs, such as APs 105, using the AP communications module 460.

Figure 5:
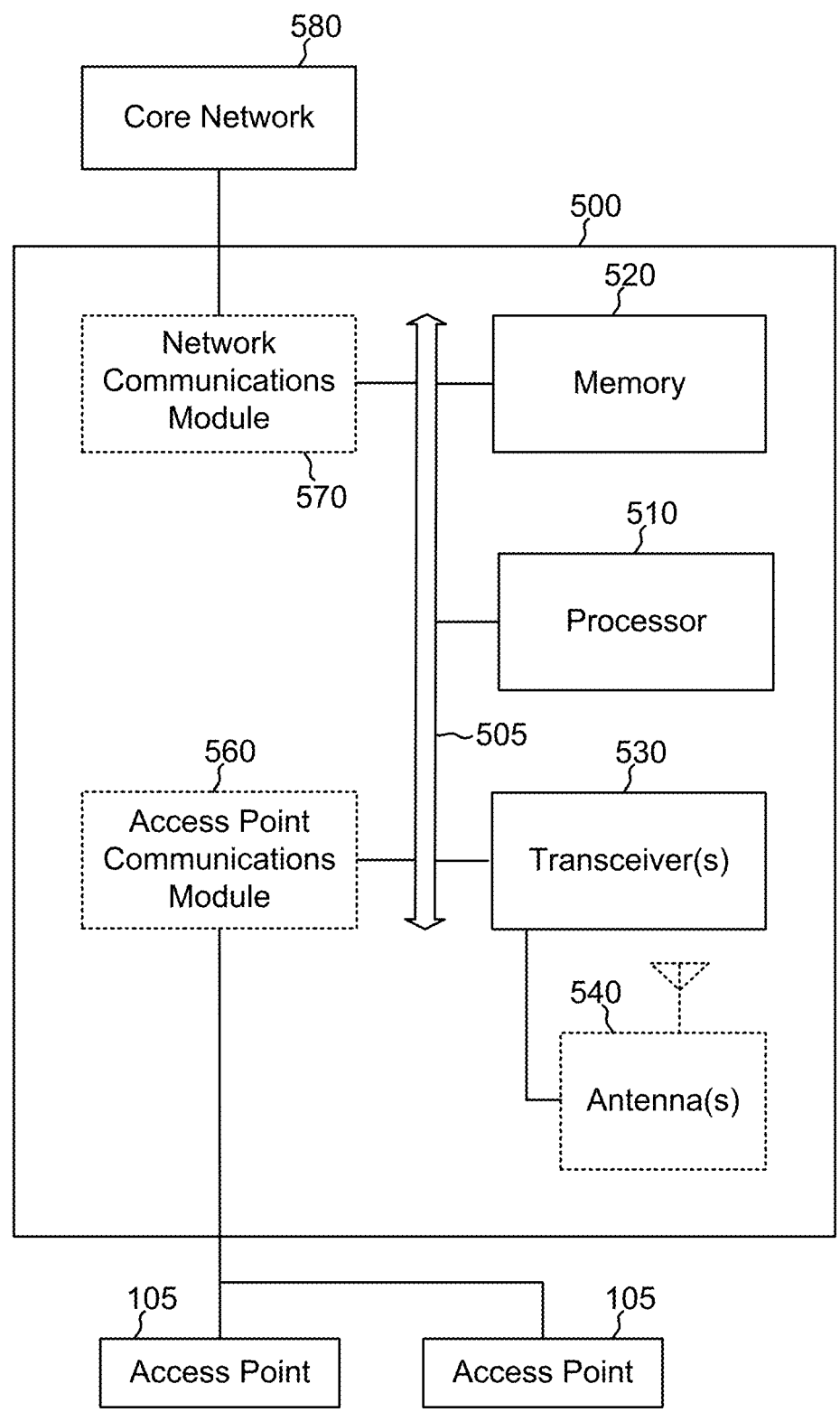
FIG. 5 shows a block diagram of an example controller for use in wireless communication.

FIG. 5 shows a block diagram of an example controller 500 for use in wireless communication. For example, the controller 500 may be an example of aspects of the controller 130 described with reference to FIGS. 1 and 2. In this example, the controller 500 includes hardware (such as dedicated hardware) to perform the functions described herein. In other examples, the controller 500 may be a logical entity whose functions are executed by one or more other computing devices (for example, one or more APs 105 or other devices in the core network or the cloud 125).

The controller 500 may include a processor 510, a memory 520, at least one transceiver 530 and, In some examples, at least one antenna 540. In some implementations, the controller 500 also may include one or both of an AP communications module 560 and a network communications module 570. Each of the components (or "modules") described with reference to FIG. 5 may communicate with one another, directly or indirectly, over at least one bus 505.

The memory 520 may include RAM and ROM. The memory 520 also may store processor- or computer-executable software code 525 containing instructions that, when executed by the processor 510, cause the processor to perform various functions described herein for wireless communication, including generation and transmission of a downlink frame and reception of an uplink frame.

The processor 510 may include an intelligent hardware device such as, for example, a CPU, a microcontroller, an ASIC, or a PLD such as an FPGA, among other possibilities. The processor 510 processes information received through the transceiver 530, the AP communications module 560, and the network communications module 570. The processor 510 also may process information to be sent to the transceiver 530 for transmission through the antenna 540, information to be sent to the AP communications module 560, and information to be sent to the network communications module 570. The processor 510 may generally be configured to perform various operations related to generating and transmitting a downlink frame and receiving an uplink frame.

The transceiver 530 may include a modem to modulate packets and provide the modulated packets to the antenna 540 for transmission, as well as to demodulate packets received from the antenna 540. The transceiver 530 may be implemented as at least one RF transmitter and at least one separate RF receiver. The transceiver 530 may communicate bi-directionally, via the antenna 540, with at least one STA 115 as, for example, shown in FIG. 1. Although only one transceiver 530 and one antenna 540 are shown in FIG. 5, the controller 500 may include multiple transceivers 530 and multiple antennas 540. The controller 500 may communicate with a core network 580 (including the cloud 125) through the network communications module 570. The controller 500 also may communicate with APs, such as APs 105, using the AP communications module 560. In some examples, the controller 500 may be configured to send and receive communications with other components (for example, APs 105, STAs 115, or the cloud 125) that conform to an IEEE 802.11 standard (such as the 802.11ac or 802.11ax amendments to the 802.11 family of standards), as well as to encode and decode such communications.

Figure 6:
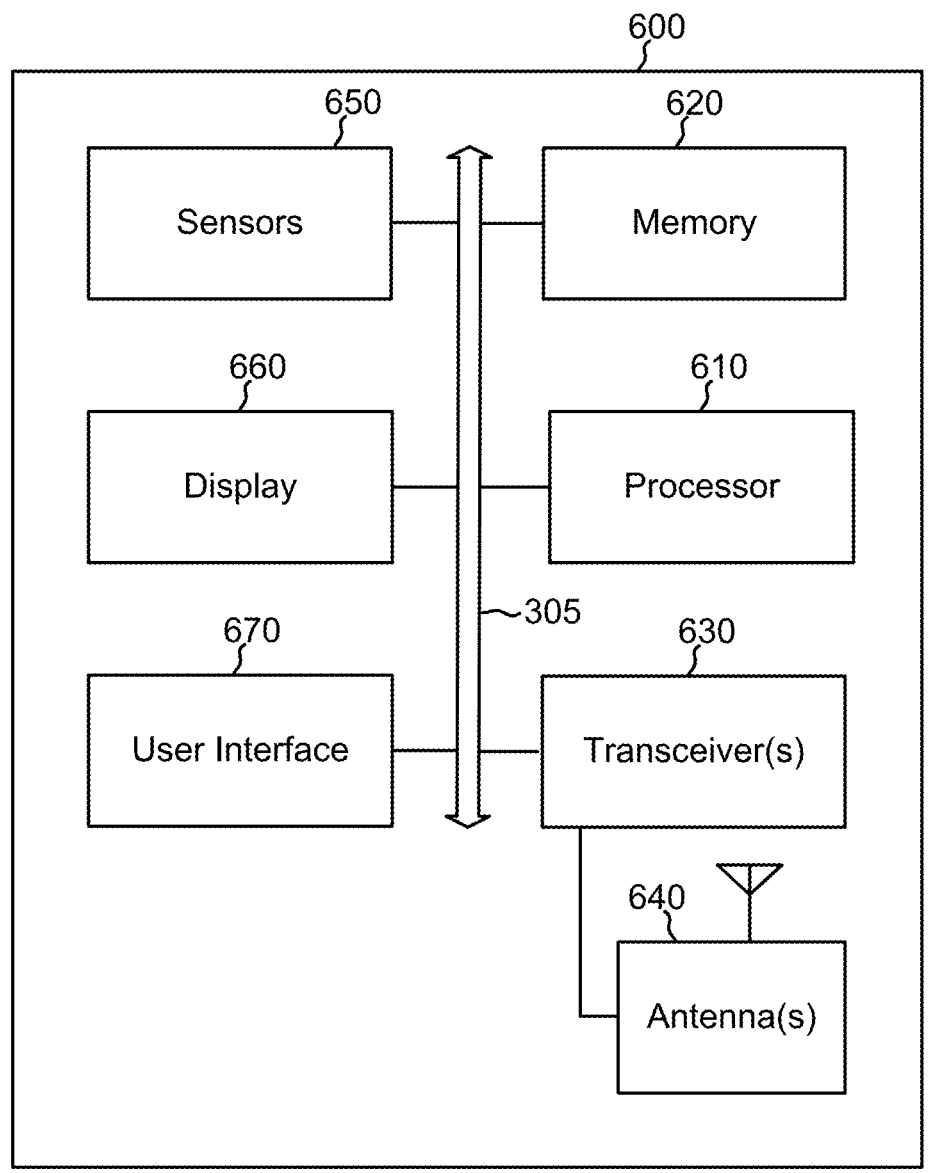
FIG. 6 shows a block diagram of an example STA for use in wireless communication.

FIG. 6 shows a block diagram of an example STA 600 for use in wireless communication. For example, the STA 600 may be an example of aspects of the STA 115 described with reference to FIG. 1. The STA 600 can be configured to send and receive frames (also referred to herein as transmissions or communications) of the wireless communication system conforming to an IEEE 802.11 standard (such as the 802.11ac or 802.11ax amendments to the 802.11 family of standards), as well as to encode and decode such frames. The STA 600 includes a processor 610, a memory 620, at least one transceiver 630 and at least one antenna 640. In some implementations, the STA 600 additionally includes one or more of sensors 650, a display 660 and a user interface (UI) 670 (such as a touchscreen or keypad). Each of the components (or "modules") described with reference to FIG. 6 can communicate with one another, directly or indirectly, over at least one bus 605.

The memory 620 can include RAM and ROM. The memory 620 also can store processor- or computer-executable software code 625 containing instructions that, when executed, cause the processor 610 to perform various functions described herein for wireless communication, including reception of a downlink frame and generation and transmission of an uplink frame.

The processor 610 includes an intelligent hardware device such as, for example, a CPU, a microcontroller, an ASIC or a PLD such as an FPGA, among other possibilities. The processor 610 processes information received through the transceiver 630 as well as information to be sent to the transceiver 630 for transmission through the antenna 640. The processor 610 can be configured to perform various operations related to receiving a downlink frame and generating and transmitting an uplink frame.

The transceiver 630 can include a modem to modulate packets and provide the modulated packets to the antenna 640 for transmission, as well as to demodulate packets received from the antenna 640. The transceiver 630 can be implemented as at least one RF transmitter and at least one separate RF receiver. The transceiver 630 can communicate bi-directionally, via the antenna 640, with at least one AP 105 as, for example, shown in FIG. 1. Although only one transceiver 630 and one antenna 640 are shown in FIG. 6, the STA 600 can include two or more antennas. For example, in some STA implementations, the STA 600 can include multiple transmit antennas (each with a corresponding transmit chain) and multiple receive antennas (each with a corresponding receive chain).

Figure 7:
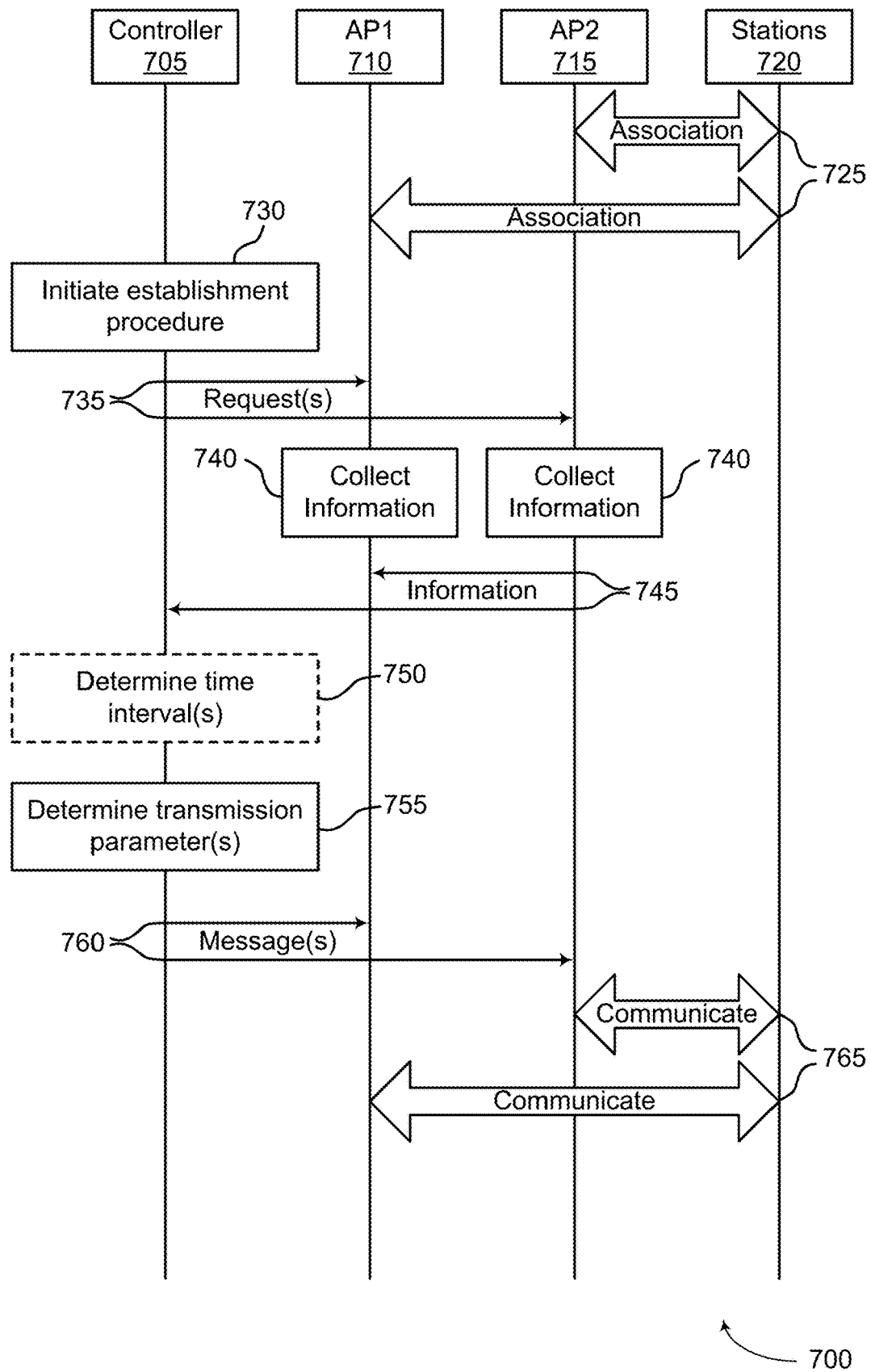
FIG. 7 shows an example of a swim lane diagram for use in wireless communication.

FIG. 7 shows an example of a swim lane diagram 700 for use in wireless communication. The swim lane diagram 700 illustrates how a controller 705 may manage the operations of multiple APs (for example, a first AP 710 and a second AP 715) to enable those multiple APs to communicate with the STAs 720 in an efficient manner. The controller 705 may be an example of the controllers 130 or 500 described with reference to FIGS. 1, 2, 4, and 5. The APs 710 and 715 may be examples of the APs 105 and 400 described with references to FIGS. 1, 2, 4, and 5. The STAs 720 may be examples of the STAs 115 and 600 described with reference to FIGS. 1, 2, and 6. In some instances, specific functions are described as being performed by a single AP. Unless otherwise noted, any function performed by the first AP 710 or the second AP 715 may, additionally or alternatively, be performed by another AP that is coupled with the controller 705.

At 725, one or more STAs 720 may be associated with either the first AP 710, or the second AP 715. The STAs 720 may exchange messages with the APs 710 and 715 as part of association processes. For example, a STA 720 may send a probe request to one or more of the APs 710 and 715. Upon receiving the probe, the first AP 710 may transmit a probe response. The STA 720 may transmit an authentication request based on receiving the probe response. The first AP 710 may transmit an authentication response based on receiving the authentication request. The STA 720 may transmit an association request based on the STA 720 being authenticated (as indicated by the authentication response). The first AP 710 may transmit an association response based on receiving the association request. In some examples, the controller 705 and the APs 710 and 715 exchange one or more association messages including multiple requests and/or a set of responses. After STA 720 is authenticated by and associated with the first AP 710, the STA 720 and the first AP 710 may exchange communications in both uplink and downlink directions. The association process may be repeated for any association or pairing of AP and STA.

At 730, the controller 705 may initiate an establishment procedure that allows the controller 705 to begin performing scheduling functions for the first AP 710 and the second AP 715. The establishment procedure may include the controller 705 transmitting one or more requests 735 to the APs 710 and 715. The requests 735 may indicate what information or statistics the controller 705 would like the APs 710 and 715 to report to the controller 705. The requests 735 may also include indicators of timing requirements for reporting the information or statistics. Timing requirements may include periodic or event-based reports. In some examples, one or more of the requests 735 may request that the APs 710 and 715 collect statistics or other information about signals associated with or received by the APs 710 and 715, collect statistics or other information about STAs 720 associated with the respective APs 710 and 715, or collect statistics or other information about any devices from which the respective APs receive signals (whether associated STAs, non-associated STAs, other APs, or other devices, or a combination thereof).

In some examples, as part of the establishment procedure, an AP 710 may send a message to the controller 705 when the AP is booting up. The controller 705 may respond with another message to establish the connection between the AP 710 and the controller 705.

At 740, one or both of the first AP 710 and the second AP 715 may collect statistics or other information 745 (hereinafter "information 745") to be reported to the controller 705. The APs 710 and 715 may collect the information 745 based on receiving at least one request 735.

The APs 710 and 715 may identify information 745 about signals received by the respective AP. The signals received by the respective AP may be used to determine other information 745 about the signals themselves, information 745 about the communication links established using the signals, or information 745 about the devices that transmitted the signals (for example, STAs 720, other APs, or other devices). The APs 710 and 715 may identify information 745 about stations that have an established communication link with the respective AP (for example, STAs associated with the respective AP). The APs 710 and 715 may identify information 745 about stations that do not have an established communication link with the respective AP (for example, STAs not associated with the respective AP). The APs 710 and 715 may identify information 745 about other APs. In some examples, the first AP 710 or the second AP 715 may identify information 745 or statistics about a first group of STAs 720 that are associated with the respective AP and a second group of STAs 720 that are not associated with the respective AP.

In some examples, the information 745 may include an indicator of whether an AP includes traffic pending for at least one station, or the amount of pending traffic, such as the number of bytes or packets. The amount of pending traffic may be indicated for each quality of service (QoS) category, or an access category (AC), or a traffic identifier (TID) of the pending traffic. In some examples, the information 745 may include one or more of a list of stations tracked by the respective AP, a signal quality indicator associated with a communication link between the AP and a STA 720, a beacon report about beacons received from other APs, client statistics, BSS statistics, or a power state of a STA 720. In some examples, the information 745 may include a power save state of a STA 720, whether associated or not associated with any given AP.

In some examples, the APs 710 and 715 may report to the controller 705 per-AP and per-STA statistics as part of the information 745. Some reports may be generated and transmitted to the controller 705 in a periodic fashion and some reports may be generated and transmitted responsive to the occurrence of an event.

In some examples, the AP 710 (or AP 715 or any other AP controlled by the controller 705) may report a list of STAs 720 tracked by the AP 710 to the controller 705. The AP 710 may maintain a list of client MAC addresses for which specific measurements and events are tracked and reported to the controller 705. In some instances, the AP 710 may update the list based on receiving one or more command messages from the controller 705. A STA 720 having a MAC address that is in the list may be referred to as a tracked STA. In some examples, the AP 710 may clear the list of tracked STAs based on receiving a command message from the controller 705. In some examples, signal quality indicators provided by one or more of the APs 710 and 715 may be associated with one or more STAs 720 included on the list of tracked STAs.

In some examples, the AP 710 (or AP 715 or any other AP controlled by the controller 705) may report one or more signal quality indicators associated with a communication link between the AP 710 and a STA 720. The signal quality indicator may include a received signal strength indicator (RSSI), a received signal received power (RSRP), a received signal received quality (RSRQ), a signal-to-interference-plus-noise ratio (SINR), a signal-to-noise ratio (SNR), or a combination thereof. The AP 710 may track the RSSIs associated with received uplink transmissions, on a per-STA basis, for each tracked STA, whether associated or non-associated with the AP 710. The AP 710 may periodically report the RSSI to the controller 705. For each tracked STA, the AP 710 may send to the controller 705 a periodic signal quality indicator report by using a message. In some examples, a single message may include signal quality indicators for more than one tracked STA 720. An AP 710 may send the signal quality indicator report for the tracked STAs once every report period. The signal quality indicator for a STA 720 may be based on the reception of data or control management frames from that STA 720, even if not addressed to the receiving AP 710. In some examples, the information 745 may include one or more signal quality indicators associated with a communication link between the AP 710 and a STA 720. In some examples, the signal quality information is for STAs 720 associated with the AP 710 or STAs 720 not associated with the AP 710, or both.

In some examples, the AP 710 (or AP 715 or any other AP controlled by the controller 705) may transmit a report to the controller 705 that includes information 745 or statistics about received beacons sent by neighboring APs. For example, the AP 710 may send a message to the controller 705 reporting information regarding the beacons received from the other APs. In some examples, the message about the beacons may be reported according to period indicated in a control message received from the controller 705. The message may include data for beacons received since the last transmission of the message. In some examples, only beacons with an SSID equal to a service set identifier field indicated in the control message are reported.

In some examples, the AP 710 (or AP 715 or any other AP controlled by the controller 705) may report per-STA statistics to the controller 705. In some implementations, the information 745 may include the pre-STA statistics. The per-STA statistics may be collected over a measurement interval identified by a start timing synchronization function (TSF) and/or an end TSF, and reported using a periodicity that may be different than the measurement interval. In some examples, the measurement interval may be equal to the period for transmitting the message (for example, message 760) or may be different than the period (additional details about the measurement interval and the report period are described herein with reference to FIG. 9). In some examples the start TSF and end TSF of a measurement interval are the same as the start TSF and end TSF of a schedule interval, respectively, as shown for example in FIG. 9. The information 745 may include statistics for one or more STAs, and per each STA it may include statistics for one or more measurement intervals.

In some instances, the AP 710 may be configured to send per-STA statistics (for example, as part of the information 745) for STAs 720 when the respective STAs 720 are in a power save state, when the respective STAs 720 have transitioned to a power save state after the last report, or when there is a change in at least one of the metrics to be reported, or a combination thereof. In some examples, the AP 710 may report the following statistics (for example, as part of the information 745) on a per-STA basis: the STA's MAC address, a queue length when the report is generated, whether the STA 720 is in an active state or a power save state, a quality of service (QoS) metric (such as an air time target, a delay requirement, a latency requirement, or a throughput requirement). Each report for a STA 720 may include, for each of one or more measurement intervals, a measurement interval identifier, a packet error rate (PER) during the measurement interval, a retry rate associated with the transmitted physical layer convergence procedure (PLCP) protocol data units (PPDUs) during the measurement interval, the last data modulation and coding scheme (MCS) used during a measurement interval, air time used by the STA 720 during the measurement interval, or the number of bytes (or MSDUs) successfully sent by the STA 720 during the measurement interval, or a combination thereof. In some examples, some of these statistics may be provided as averages averaged within a measurement interval or across multiple measurement intervals.

In some examples, the AP 710 (or AP 715 or any other AP controlled by the controller 705) may report BSS statistics to the controller 705. In some implementations, the information 745 may include the BSS statistics. In some instances, the BSS statistics may be reported periodically using a period indicated in a control message.

In some examples, the AP 710 (or AP 715 or any other AP controlled by the controller 705) may transmit a report to the controller 705 responsive to a STA 720 becoming associated with, or re-associating with, the AP 710. The AP 710 may send a message to the controller 705 that includes the report. The report may indicate one or more identifiers of the associated or re-associated STA as well as other information (for example, an associated timestamp or information regarding capabilities of the STA).

In some examples, the AP 710 (or AP 715 or any other AP controlled by the controller 705) may transmit a report to the controller 705 responsive to determining that a STA 720 or the AP 710 has updated a block acknowledgement (BA) session. In some implementations, the information 745 may include the report about the BA session. The AP 710 may send a message to the controller 705 indicating the updated BA session. The controller 705 may then transmit an indication about the updated BA session to other APs.

In some examples, the AP 710 (or AP 715 or any other AP controlled by the controller 705) may transmit a report to the controller 705 responsive to determining that a STA 720 has updated its power state (for example, a power save state). In some implementations, the information 745 may include the report about the power state. The AP 710 may send a message to the controller 705 indicating the updated power state (for example, a power save state).

In some examples, the AP 710 (or AP 715 or any other AP controlled by the controller 705) may report a service stop event associated with a STA 720. In some implementations, the information 745 may include the report about the service stop. The AP 710 may send a message to the controller 705 (or another AP) indicating the service stop.

After collecting the information 745 (or statistics) described herein, the AP 710 (or AP 715 or any other AP controlled by the controller 705) may transmit the information 745 to the controller 705. The information 745 may be reported in a single message or in multiple messages. In some examples, the information 745 may include association information for a STA 720 or capability information for a STA 720 associated with the one or more APs 710 or 715. In some examples, the information 745 may include association information or capability information indexed based on each associated STA 720.

Upon receiving information 745 from each of one or more APs 710 and 715, the controller 705 may use the information 745 to manage the network and schedule resources to be used or allocated by one or more of the APs 710 and 715. For example, the controller 705 may divide up a time-based resource into one or more time intervals. The controller 705 may then determine transmission parameters for each AP during each time interval. This way, the controller 705 may be configured to improve the efficiency of the network. In some examples, the controller 705 may determine conditions of communication links between APs and STAs in the network and may use the determined conditions when determining the time intervals or the transmission parameters or both.

At block 750, the controller 705 may (optionally) determine time intervals to be used by the APs 710 and 715 to communicate with STAs 720. The controller 705 may divide a specific duration into different time intervals. In some examples, the specific duration may be referred to as a schedule. The schedule may include any number of time intervals. The time intervals may be any length of time that is less than or equal to the length of time of the schedule. One or more transmission parameters for each one or more respective APs may be associated with each of the time intervals. In some examples, the controller 705 may determine whether a time interval is associated with uplink signals or downlink signals. The controller 705 is configured to determine time intervals, transmission parameters, or both for both uplink communications and downlink communications. Additional details about the time intervals are described with reference to FIG. 8.

In some examples, one or more time intervals associated with a first AP 710 may (optionally) be aligned in time with one or more time intervals associated with a second AP 715 (in other words, one or more time intervals may be shared by the first AP 710 and the second AP 715). In some examples, time intervals aligned in time may share a common start time, a common end time, or both a common start time and a common end time. In some other cases, the time intervals associated with the first AP 710 may be different than the time intervals associated with the second AP 715. A first time interval may be different than a second time interval when a start time of the time intervals are different, an end time of the time intervals are different, or transmission parameters associated with the time intervals are different, or a combination thereof.

At block 755, the controller 705 may determine one or more transmission parameters associated with communications of the APs 710 and 715. In some examples, the one or more transmission parameters may be associated with each time interval. The transmission parameters may define one or more operations that the APs 710 and 715 may be permitted to do during the respective time interval or that may be permitted to do when performing specific communications. For example, an operation that may be indicated by a transmission parameter may include that the AP 710 is permitted to communicate with one or more stations or a group of STAs 720 during the time interval or that specific communications may be communicated with one or more stations or a group of STAs 720. Other examples of an operation that may be indicated by the transmission parameter may include one or more beamforming operations, one or more backoff operations, one or more enhanced distributed coordination function (DSF) channel access (EDCA) operations, one or more energy detection operations, one or more clear channel assessment (CCA) operations, one or more acknowledgement (ACK) policy operations, one or more dummy packet operations, one or more request-to-send (RTS) operations, one or more power management operations, one or more rate adaptation operations, or any combination thereof. The one or more operations performed by the AP 710 or 715 may be indicated by the transmission parameters or information in the transmission parameters.

In some example implementations, a transmission parameter determined by the controller 705 may include an indicator of what STAs 720 each of the APs 710 and 715 is permitted to communicate with during, for example, the time interval. For example, the AP 710 may be permitted to communicate with less than all of the STAs 720 that are associated with the AP 710. In other examples, the transmission parameter may indicate that the AP 710 is permitted or instructed to select which STAs 720 to communicate with. In yet other examples, the transmission parameter may indicate that the AP 710 is to be silent during the time interval and not communicate with any STAs 720. In yet other examples, the transmission parameter may indicate that the AP 710 is allowed to communicate with all of the associated STAs 720 during the time interval.

In some examples, the controller 705 may identify the STAs 720 permitted to communicate with the AP 710 during the time interval individually. Additionally or alternatively, the controller 705 may identify groups of STAs 720 for communication with the AP 710 during the time interval. In some implementations, the controller 705 may identify identifiers for the STAs or the groups of STAs and communicate those identifiers to the APs 710 and 715.

In some example implementations, a transmission parameter determined by the controller 705 may include configuration parameters for the schedule and (optionally) one or more of its associated time intervals. In some examples, configuration parameters may be defined on a per-time-interval basis. In some examples, each of one or more of the time intervals may be associated with a time interval type, in which case the configuration parameters may be defined on a per-interval-type basis. The controller 705 may transmit the configuration parameters to each AP at a startup time or when significant changes to the configuration of the schedule are made. The controller 705 may transmit a message to the APs 710 and 715 periodically that includes the current configuration for the schedule and its time intervals. The message transmitted by the controller 705 may include a field that indicates a time for implementing the new configuration. In some examples, after receiving the new configuration information from the controller 705, the AP 710 may implement the new configuration when the local timing synchronization function (TSF) of the AP 710 is equal to the time included in the field of the message.

In some examples, a transmission parameter determined by the controller 705 may include a backoff parameter for the AP 710. The backoff parameter may indicate whether a backoff procedure is to be used by the AP 710 during an associated time interval.

In some examples, a transmission parameter determined by the controller 705 may include parameters for EDCA. The EDCA parameters may define one or more of a minimum contention window parameter, a maximum contention window parameter, a transmission opportunity parameter, or an arbitration inter-frame spacing parameter.

In some examples, a transmission parameter determined by the controller 705 may include an energy detection threshold parameter. This parameter may indicate information for a primary channel.

In some examples, a transmission parameter determined by the controller 705 may include a CCA configuration parameter. This parameter may indicate that the AP 710 is to use one or more of a set of CCA configurations. A CCA configuration may identify a specific configuration of deferral parameters, such as an energy detection parameter, a packet detection parameter, and a network allocation vector (NAV). In at least one of the configurations, each AP including AP 710 may be provided a list of colors associated with the controller 705. The NAV procedures implemented may be based on whether the AP 710 receives a PLCP protocol data unit (PPDU) from an AP with a color listed in the list of colors.

In some examples, a transmission parameter determined by the controller 705 may include an ACK policy parameter. This parameter may indicate whether the AP 710 is to use one or more of an immediate acknowledgement policy during the time interval, a delayed block acknowledgement (BA) policy during the time interval, or whether the acknowledgement policy is to be determined by the AP 710.

In some examples, a transmission parameter determined by the controller 705 may include a dummy packet parameter. This parameter may indicate whether the AP 710 is to send dummy packets during portions of a time interval during which the AP 710 is not transmitting or receiving traffic.

In some examples, a transmission parameter determined by the controller 705 may include an RTS parameter. This parameter may indicate whether the AP 710 is permitted to use RTS during the time interval. In some examples, the controller 705 may send a message to an AP 710 to configure the usage of RTS messages on a per-STA basis. In some examples, the RTS setting from the message may be overridden by the RTS parameter included in a schedule interval definition. For STAs for which no explicit RTS configuration is received from the controller 705, the AP 710 may use its default RTS policy or the policy indicated in a schedule interval.

In some examples, a transmission parameter determined by the controller 705 may include a power management state change of a STA 720. This parameter may be used to make sure that STAs can safely transition out of a power save state. Buffered data or management frames may be sent in accordance with the schedule.

In some examples, a transmission parameter determined by the controller 705 may include a rate adaptation parameter. This parameter may be based on an expected SINR for a given time interval. For example, transmission parameters assigned to a STA 720 for a first interval may be different than transmission parameters assigned to the STA 720 during a second interval. The expected SINR for each of these time intervals may be different based on the different transmission parameters.

In some examples, a transmission parameter determined by the controller 705 may include a beamforming parameter. This parameter may indicate whether a beamforming operation is permitted during the time interval. In some examples, this parameter may indicate one or more characteristics of the permitted beamforming.

In some examples, a transmission parameter determined by the controller 705 may include one or more types of frames that are permitted (for example, to be communicated) during the time interval.

In some examples, the information indicated by the transmission parameter may be formatted in accordance with, but not limited to, the IEEE 1905.1 standard, the IEEE 802.11 standard, other standards, or combinations thereof. Table 1 indicates an example of a message which may follow the 1905.01 standard and include one or more type-length-value elements, sometimes referred to as TLV elements. For example, the message may include, but is not limited to, one or more type fields, one or more length

TABLE 1

An example of a message.

| tlvType | 1 octet | 0xXX | Information or Control |
|---|---|---|---|
| tlvLength | 2 octets | variable | Number of octets in ensuing field |
| tlvValue | 1 octet | k | Content of the message | fields, one or more value fields, or a combination thereof.

In some examples, the information indicated by the transmission parameter may be an example of an Information Element which may follow the 802.11 message which may include one or more type-length-content elements, sometimes referred to as TLC elements. Table 2 indicates an example of a message which may additionally or alternatively include one or more type fields, one or more length fields, and/or one or more content fields.

As an example, the one or more type fields may identify a set of messages and/or information included in the set of messages. In some examples, the messages and/or the information included in the set of messages may be a set and/or a subset of a

TABLE 2

An example of a message.

| Element ID | Length | Content |
| --- | --- | --- | control message from the cloud controller to the AP 710 and/or the cloud 125 to the AP 710. Additionally or alternatively, the messages and/or the information included in the set of messages may be a set and/or a subset of a control message from the AP 710 to the cloud controller and/or the cloud 125 to the AP 710. For example, the set and/or subset of the information messages may indicate one or more value fields, one or more content fields, and/or one or more type fields, among other fields.

Additionally or alternatively, the one or more value fields and/or the one or more content fields may include one or more subfields describing the information of one or more of the messages related to the set and/or subset indicated by the one or more type field. For example, Table 3 represents a message with the type-length-value

TABLE 3

An example of a message.

| tlvType | 1 octet | 0xXX | Per-STA Statistics |
| --- | --- | --- | --- |
| tlvLength | 2 octets | variable | Number of octets in ensuing field. |
| tlvValue | 1 octet | k | Number of STAs reported |
|  | 2/4 octets |  | MAC Address or AID |
|  | 1 Octet |  | RSSI |
|  | 2 Octet |  | BytesTx |
|  | 2 Octet |  | BytesRx |
|  | 2 Octet |  | Queued Bytes |
|  | 2 Octet |  | Average Queue Len |

TABLE 4

An example of a message.

| Element ID | Length | Content | Number of STAs reported | MAC Address or AID | RSSI | BytesTx | BytesRx | Queued Bytes | Average Queue Length |
| --- | --- | --- | --- | --- | --- | --- | --- | --- | --- | element information. In another example, Table 4 indicates a case of an Information Element message.

After determining the transmission parameters, the controller 705 may transmit one or more messages 760 to the APs 710 and 715 (or any other AP controlled by the controller 705) that include the transmission parameters. The transmission parameters may be transmitted in a single message or in multiple messages.

As described herein, each of the time intervals may be defined with respect to a time interval type. In some examples, the controller 705 may determine the type of a time interval. The type of the time interval may refer to an arrangement of transmission parameters for the time interval. In some instances, the arrangement of transmission parameters for each type of time interval may be preconfigured or predetermined. In such instances, the preconfigured arrangements may be stored in a memory of the controller 705, memories within the APs 710 or 715, or in both the controller 705 and in the APs 710 and 715. In some examples, the arrangement of transmission parameters for a given time interval type may be preconfigured or predetermined such that the controller 705 and one or more of the APs 710 and 715 may know or have stored the predetermined arrangements. The controller 705 may indicate the type of the time interval in a message 760 and APs 710 and 715 may determine the transmission parameters based on the indication of the type of the time interval.

In some examples, the types of time intervals can include an AP-time type, a silent type, and one or more additional types. These types are described for illustrative purposes. Transmission parameters may be arranged in any manner to form a type of a time interval. Additional details about the types of time intervals are described with reference to FIG. 9.

During a time interval of the AP-time type, the AP 710 may not be under the control of the controller 705. During an AP-time time interval, the AP 710 may decide to use the surrounding wireless medium as it chooses. The AP 710 may serve any STA 720 during an AP-time time interval. In some examples, AP 710 may communicate using regular EDCA during a time interval that has the type AP-time. In some examples, the AP-time type indicates that at least one access point may serve any station with the access point during the time interval.

During a time interval of the silent type, the AP 710 may be configured to not send any PPDUs containing data traffic. In some examples, the AP 710 may be configured to send messages or information related to a power save state during a time interval having the silent type. For example, the AP 710 may receive a transmission that indicates a power management state change of a STA 720 and respond accordingly. In some examples, the silent type indicates that at least one access point (but typically not all access points) does not transmit data packets during the time interval.

Additional types of time intervals may refer to different collections of transmission parameters that the controller 705 may select as an entire collection. The controller 705 may communicate the selection to the APs 710 and 715. Many additional types of time intervals associated with the collections of transmission parameters may be defined by the controller 705, the APs 710 or 715, or a combination thereof.

At 765, the APs 710 and 715 may communicate with STAs 720 based on the time intervals and associated transmission parameters received from the controller 705. In some examples, this may cause the first AP 710 and the second AP 715 to coordinate at least some of their communications.

Figure 8:
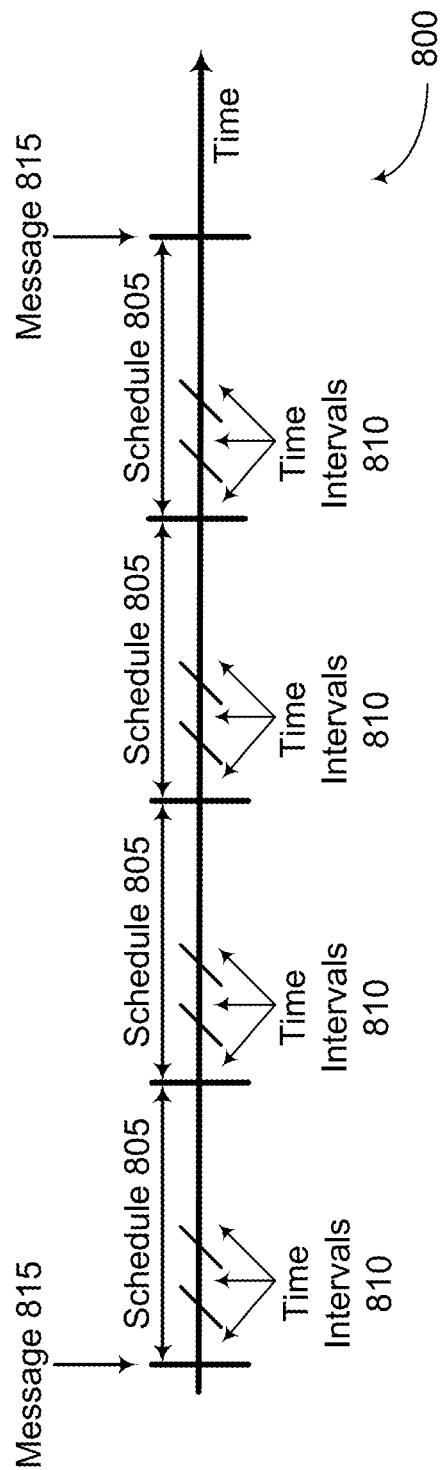
FIG. 8 shows an example of a timing diagram for use in wireless communication.

FIG. 8 shows an example of a timing diagram 800 for use in wireless communication. The timing diagram 800 illustrates how a controller (for example, controller 705) may (optionally) divide up a time unit, such as a schedule 805, into a set of time intervals 810. The timing diagram 800 also illustrates how a controller may periodically inform an AP (for example, AP 710 or AP 715) about changes to the time intervals 810, including changes in one or more transmission parameters, using one or more messages 815. The one or more messages 815 may be examples of the messages 760 described with reference to FIG. 7.

A schedule 805 may refer to a time-based resource that the controller may divide into a set of time intervals. The duration of the schedule 805 may itself be a parameter that is adjustable. For example, the duration of a schedule 805 may be of any length of time defined by a schedule definition. The schedule definition may define a sequence of time intervals and durations of time intervals. In some examples, a schedule 805 may span approximately 50 milliseconds (ms). The duration of each time interval 810 may range between approximately 1 ms and 40 ms. In some examples, time intervals 810 are mutually exclusive; that is, not overlapping.

Upon the completion of a schedule 805, an AP may repeat the schedule 805 until an updated schedule definition is received from the controller. Said another way, the controller may group a discrete number of time intervals 810 together to define a schedule 805 and the AP may repeat the schedule (repeating the time intervals from schedule duration to schedule duration until an updated schedule definition is received. For example, the timing diagram shows that an AP may use four identical schedules 805 sequentially before a new message 815 is received to change the schedule definition.

The controller may identify a duration for each time interval 810. The controller may also identify a start time, a stop time, or both for each time interval 810. The controller may also identify an order for (the sequence of) the time intervals 810 within the schedule 805. In some examples, the controller may identify a type of each time interval 810. The controller may identify the STAs that it permits to be served during each time interval 810. The configuration parameters for the schedule and for the constituent time intervals, or interval types, may define a transmission mode for each time interval. The controller may identify the type of each time interval and the related transmission parameters (for example, medium access parameters to be used by the AP during the time interval 810 such as EDCA, CCA). The controller may also determine other mode settings or transmission parameters associated with the time interval 810 (for example, but not limited to, short interface space (SIFS) bursting, ACK policy, and/or fairness rules).

During some types of time intervals, for example, an AP-time type time interval 810, an AP is permitted to determine which STAs it will communicate with. In some examples, the AP may select the MCS to use during the time interval 810, PPDU duration and start times, or other parameters.

Figure 9:
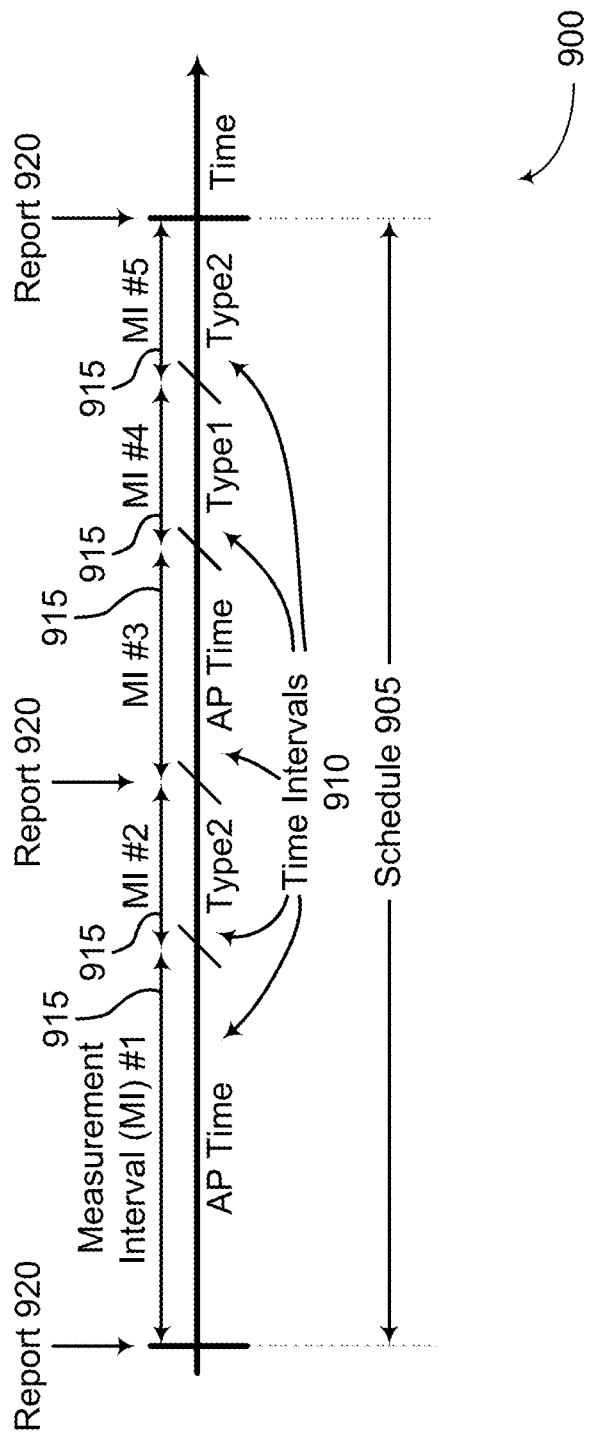
FIG. 9 shows an example of a timing diagram for use in wireless communication.

FIG. 9 shows an example of a timing diagram 900 for use in wireless communication. The timing diagram 900 shows a single schedule 905. The timing diagram 900 shows time intervals 910 assigned to have specific types, how measurement intervals 915 correspond to the time intervals 910, and how an AP may periodically inform the controller about the measurements through measurement reporting 920. The schedule 905 may be an example of a schedule 805 described with reference to FIG. 8. The time intervals 910 may be examples of the time intervals 810 described with reference to FIG. 8. The reports 920 may be examples of the information 745 described with reference to FIG. 7.

Each time interval 910 in the schedule 905 is assigned a specific type. For example, the time intervals 910 are shown as being assigned AP-time, silent-time, or other types of communication parameters. The controller and the AP may implement one or more operations based on the transmission parameters associated with the type of the time interval 910. Examples of an operation performable by the AP that may be indicated by the transmission parameter may include one or more beamforming operations, one or more backoff operations, one or more EDCA operations, one or more energy detection operations, one or more CCA operations, one or more ACK policy operations, one or more dummy packet operations, one or more RTS operations, one or more power management operations, one or more rate adaptation operations, or any combination thereof.

The controller may also determine other transmission parameters not expressly identified in the definition of a particular type of a time interval. For example, for some time intervals 910, the controller may identify STAs that are permitted to communicate with the AP during the time interval 910. While the time intervals 910 are shown having particular transmission parameters and associated types, a time interval 910 may include any combination of transmission parameters described herein.

The schedule 905 also includes multiple measurement intervals 915. Each measurement interval 915 is an interval over which an AP collects information or statistics to be reported back to the controller. In some examples, each measurement interval 915 may be equivalent to (aligned in time to and of the same duration as) a respective one of the time intervals 910 of the schedule 905. In some other cases, measurement intervals 915 may be periodic having fixed durations independent of the start times and durations of the time intervals 910. In such cases, the fixed duration of the measurement interval 915 may be determined by the AP.

Periodically, the AP may report the measurements taken during one or more measurement intervals. The AP may transmit a report 920 to the controller that includes information or statistics measured during one or more measurement intervals 915. In some examples, the period for transmitting the reports 920 may be twice every schedule 905. In other cases, the period for transmitting the reports 920 may be once every schedule 905, three times every schedule 905, four times every schedule 905, or at any other suitable frequency. In some examples, the report 920 may be transmitted once every measurement interval 915. In some examples, the report 920 may be transmitted once every time interval 910.

Figure 10:
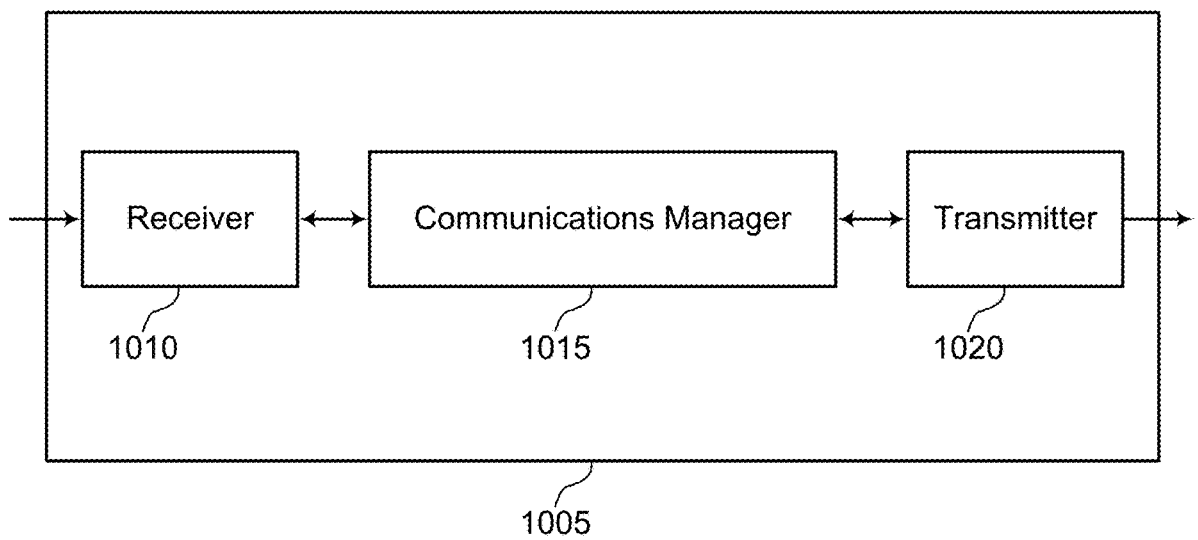
FIGS. 10 and 11 show block diagrams of devices for use in wireless communication.

FIG. 10 shows a block diagram of a device 1005 for use in wireless communication. The device 1005 may be an example of aspects of a controller as described herein. The device 1005 may include a receiver 1010, a communications manager 1015, and a transmitter 1020. The communications manager 1015 can be implemented, at least in part, by one or both of a modem and a processor. Each of these components may be in communication with one another (for example, via one or more buses).

Receiver 1010 may receive information such as packets, user data, or control information associated with various information channels (for example, but not limited to, control channels, data channels, and/or information related to techniques for controlling a network). Information may be passed on to other components of the device. The receiver 1010 may be an example of aspects of the transceiver 1320 described with reference to FIG. 13. The receiver 1010 may utilize a set of antennas.

The communications manager 1015 may receive information from one or more access points, determine time intervals to be used by the access points to communicate with one or more stations based on the information from the access points, determine one or more transmission parameters associated with each time interval, the one or more transmission parameters associated with each time interval defining, for the respective time interval, one or more operations that at least one of the one or more access points is permitted to perform during the respective time interval, and transmit at least one message to at least one of the one or more access points that includes the time intervals and the one or more transmission parameters associated with each time interval.

The communications manager 1015, or its sub-components, may be physically located at different locations, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a set of antennas.

Figure 11:
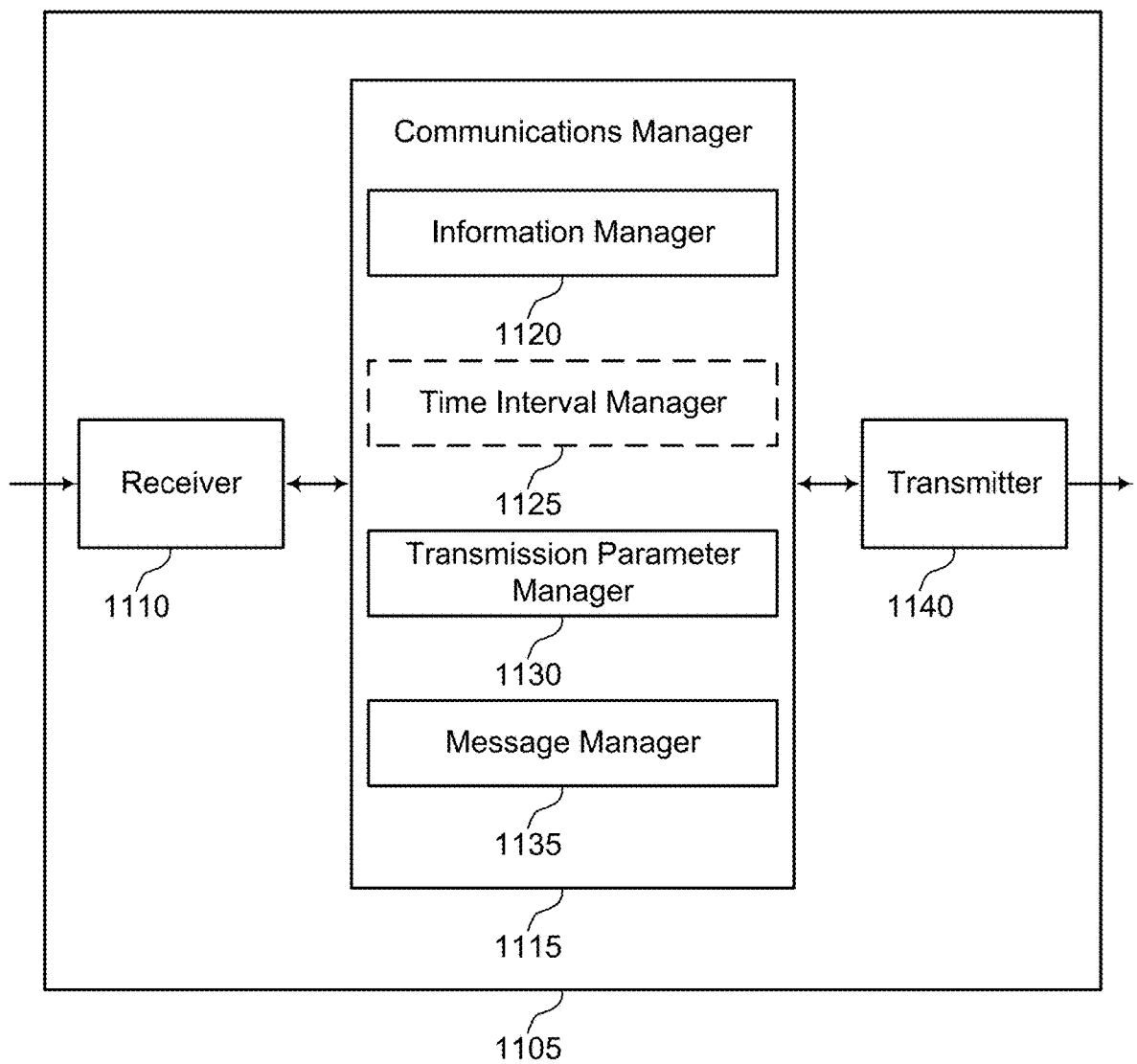

FIG. 11 shows a block diagram of a device 1105 for use in wireless communication. The device 1105 may be an example of aspects of a device 1005 or a controller 130 and 705 as described herein. The device 1105 may include a receiver 1110, a communications manager 1115, and a transmitter 1140. The communications manager 1115 can be implemented, at least in part, by one or both of a modem and a processor. Each of these components may be in communication with one another (for example, via one or more buses).

Receiver 1110 may receive information such as packets, user data, or control information associated with various information channels (for example, but not limited to, control channels, data channels, and/or information related to techniques for controlling a network). Information may be passed on to other components of the device. The receiver 1110 may be an example of aspects of the transceiver 1320 described with reference to FIG. 13. The receiver 1110 may utilize a set of antennas.

The information manager 1120 may receive information from a set of access points about signals received by the access points. The time interval manager 1125 may optionally determine time intervals to be used by the access points to communicate with one or more stations based on the information from the access points.

The transmission parameter manager 1130 may determine one or more transmission parameters and one or more operations that at least one access point of the one or more access points is permitted to perform during a respective time interval based at least in part on the information. Additionally or alternatively, the transmission parameter manager 1130 may optionally determine one or more transmission parameters associated with each time interval, the one or more transmission parameters associated with each time interval defining, for the respective time interval, one or more operations that one or more respective access points of the set of access points are permitted to perform during the respective time interval.

The message manager 1135 may transmit at least one message to at least one of the one or more access points, the message indicating the one or more operations that at least one of the access points is permitted to perform. Additionally or alternatively, the message manager 1135 may optionally transmit at least one message to the access points that includes the time intervals and the one or more transmission parameters associated with each time interval.

Transmitter 1140 may transmit signals generated by other components of the device. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a set of antennas.

Figure 12:
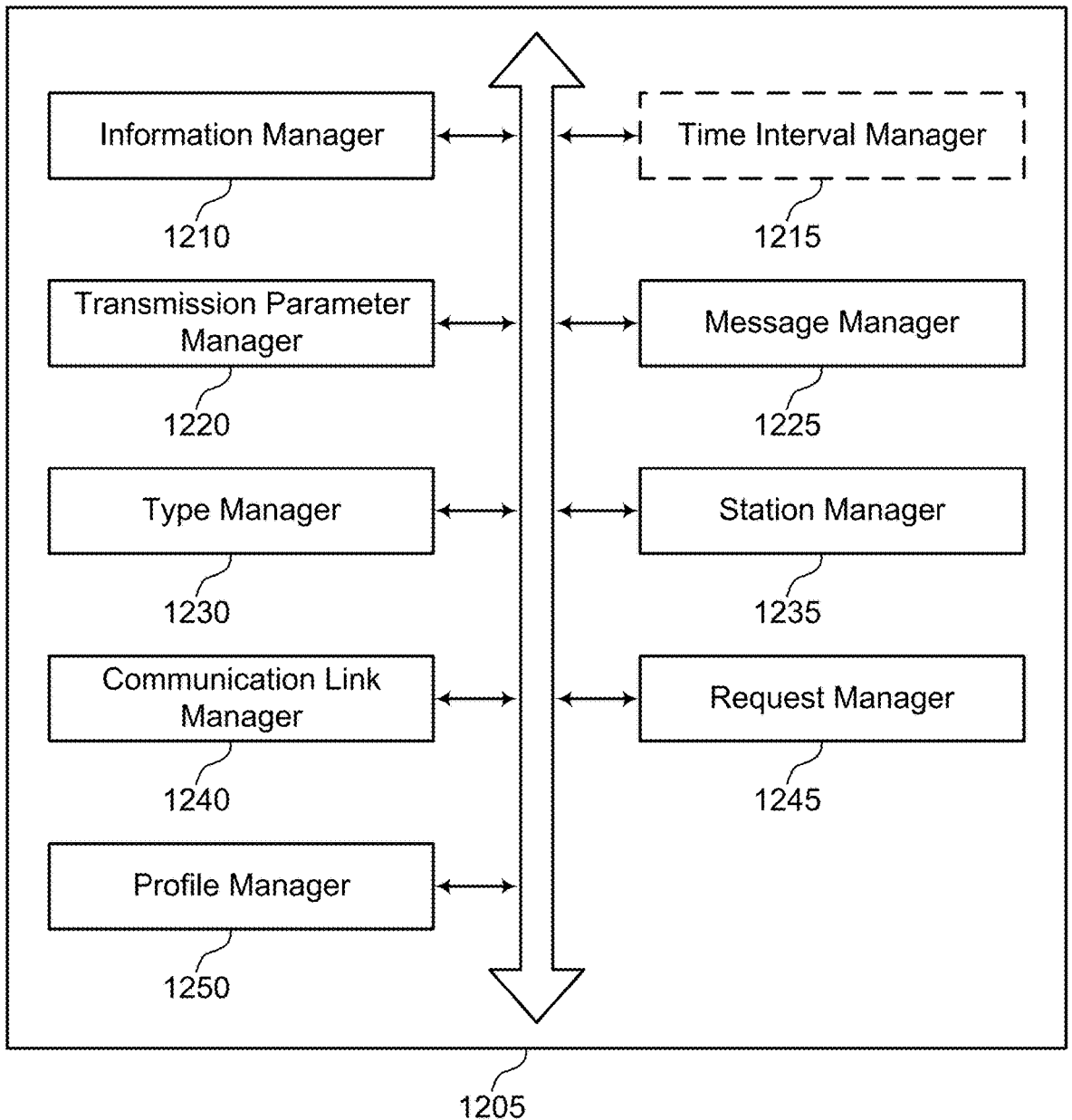
FIG. 12 shows a block diagram of a communications manager for use in wireless communication.

FIG. 12 shows a block diagram of a communications manager 1205 for use in wireless communication. The communications manager 1205 may include an information manager 1210, a time interval manager 1215, a transmission parameter manager 1220, a message manager 1225, a type manager 1230, a station manager 1235, a communication link manager 1240, a request manager 1245, and a profile manager 1250. Each of these modules may communicate, directly or indirectly, with one another (for example, via one or more buses).

The information manager 1210 may receive information from one or more access points. In some examples, receiving information from a first access point of the set of access points includes receiving statistics for a first group of stations associated with the first access point and a second group of stations that are not associated with the first access point, where determining the time intervals or determining the one or more transmission parameters associated with each time interval is based on receiving the statistics about the first group of stations and the second group of stations from the first access point.

In some examples, the information received from the set of access points includes statistics about communication links between at least some of the one or more access points and the one or more stations. In some examples, the information received from the set of access points includes an indicator of pending traffic for at least one station of the one or more stations. In some examples, the information received from the access points includes one or more of a list of stations tracked by a first access point of the set of access points, a signal quality indicator associated with a communication link between the first access point and a station, a beacon report about beacons received from other access points, client statistics, basic service set (BSS) statistics, or a power state of the station.

In some examples, the information manager 1210 may receive statistics for a first group of stations associated with a first access point of the one or more access points and a second group of stations that are not associated with the first access point, where determining the time intervals or determining the one or more transmission parameters associated with each time interval is based on receiving the statistics about the first group of stations and the second group of stations from the first access point.

In some examples, the information received from the one or more access points includes association and capabilities information per associated station. In some examples, the amount of pending traffic included in the indicator may be indicated per one or more of a QoS category, or an AC, or a TID of the pending traffic.

In some examples, the information received from the one or more access points includes one or more signal quality indicators associated with a communication link between a first access point and a station. In some examples, the station is associated with the first access point. In some examples, the station is not associated with the first access point. In some examples, the station is one of the stations indicated in a tracked list that is communicated in the at least one message. In some examples, the information received from the one or more access points includes a beacon report about beacons received from other access points. In some examples, the information received from the one or more access points includes a power state of a station.

The time interval manager 1215 may determine time intervals to be used by the access points to communicate with one or more stations based on the information from the access points. In some examples, determining whether the time interval is associated with an uplink signal or a downlink signal, where the at least one message includes an indication of whether the time interval is associated with the uplink signal or with the downlink signal.

The time interval manager 1215 may optionally determine time intervals to be used by at least one of the one or more access points to communicate with one or more stations based on the information from the one or more access points. In some examples, determining whether the time interval is associated with an uplink signal or a downlink signal, where the at least one message includes an indication of whether the time interval is associated with the uplink signal or with the downlink signal.

The transmission parameter manager 1220 may determine one or more transmission parameters associated with each time interval, the one or more transmission parameters associated with each time interval defining, for the respective time interval, one or more operations that one or more respective access points of the set of access points are permitted to perform during the respective time interval. In some examples, the one or more transmission parameters include one or more of instructions to the one or more respective access points to cause the one or more respective access points to communicate with stations associated with the one or more respective access points, a modification to a schedule associated with the one or more respective access points, a request-to-send configuration, a clear-to-send configuration, or an indication of a rate adaptation configuration. In some examples, the transmit parameters include one or more CCA configuration parameters, one or more backoff parameters, one or more EDCA parameters, one or more energy detection threshold parameters, one or more delay acknowledgement parameters, or one or more RTS parameters.

The message manager 1225 may transmit at least one message to the access points that includes the time intervals and the one or more transmission parameters associated with each time interval. In some examples, the message manager 1225 may exchange configuration information or diagnostic information associated with the access points with a cloud controller, where determining the time intervals or determining the one or more transmission parameters associated with each time interval is based on exchanging the configuration information or the diagnostic information with the cloud controller. In some examples, a controller is configured to transmit the at least one message to the one or more access points. In some examples, at least one of the one or more access points includes the controller. In some examples, a control loop of the controller is at least partially executed by a server different than the one or more access points.

The type manager 1230 may determine a type of a time interval, where determining the one or more transmission parameters is based on determining the type of the time interval. In some examples, the type of the time interval includes an arrangement of transmission parameters for the time interval. In some examples, the type of the time interval includes an AP-time type, a silent type, a type 1, a type 2, or a type 3. In some examples, the AP-time type indicates that the at least one access point may serve any station associated with the at least one access point during the time interval. In some examples, the silent type indicates that the at least one access point does not transmit data packets during the time interval.

The station manager 1235 may identify, for at least one of the time intervals, a device to communicate with a first access point of the one or more access points during the time interval, where the one or more transmission parameters indicate that the first access point is permitted to communicate with the station during the time interval.

In some examples, the station manager 1235 may determine, for at least one of the time intervals, that a first access point of the one or more respective access points is permitted to communicate during the time interval with a group of stations that have an established communication link with the first access point, where the one or more transmission parameters indicate that the first access point is permitted to communicate during the time interval with the group of stations. In some examples, determining, for at least one of the time intervals, identifiers of stations that a first access point of the one or more access points is permitted to communicate with during the time interval, where the at least one message includes the identifiers.

The communication link manager 1240 may determine conditions of communication links between the one or more access points and the one or more stations based on receiving the information from the one or more access points, where determining the one or more transmission parameters is based on determining the conditions of the communication links.

The request manager 1245 may transmit at least one request to at least one of the one or more access points to collect the information, where receiving the information is based on transmitting the at least one request.

The profile manager 1250 may identify a device profile for at least one of the one or more stations associated with the one or more access points, where determining the time intervals or determining the one or more transmission parameters associated with each time interval is based on identifying the device profile.

Figure 13:
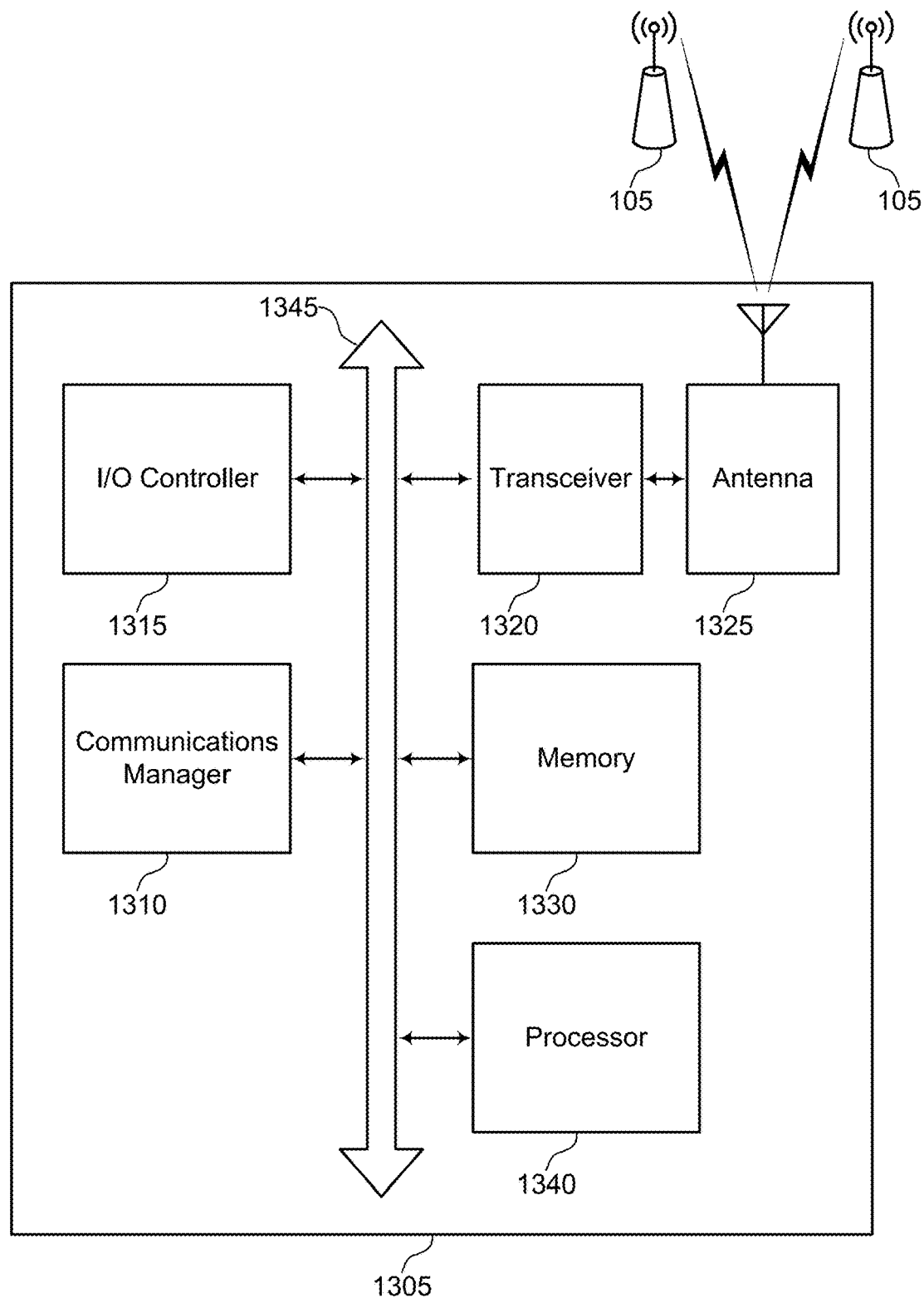
FIG. 13 shows a diagram of a system including a device for use in wireless communication.

FIG. 13 shows a diagram of a system including a device 1305 for use in wireless communication. The device 1305 may be an example of or include the components of device 1005, device 1105, or a controller as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (for example, bus 1345).

The communications manager 1310 may receive information from one or more access points, determine one or more transmission parameters and one or more operations that at least one access point of the one or more access points is permitted to perform during the respective time interval, and transmit at least one message to at least one of the one or more access points, the message indicating the one or more operations that at least one of the access points is permitted to perform. Additionally or alternatively the communications manager 1310 may optionally receive information from a set of access points about signals received by the access points, determine time intervals to be used by the access points to communicate with one or more stations based on the information from the access points, determine one or more transmission parameters associated with each time interval, the one or more transmission parameters associated with each time interval defining, for the respective time interval, one or more operations that one or more respective access points of the set of access points are permitted to perform during the respective time interval, and transmit at least one message to the access points that includes the time intervals and the one or more transmission parameters associated with each time interval.

I/O controller 1315 may manage input and output signals for device 1305. I/O controller 1315 may also manage peripherals not integrated into device 1305. In some examples, I/O controller 1315 may represent a physical connection or port to an external peripheral. In some examples, I/O controller 1315 may utilize an operating system such as iOS®, ANDROID®, MS-DOS®, MS-WINDOWS®, OS/2®, UNIX®, LINUX®, or another known operating system. In other cases, I/O controller 1315 may represent or interact with a modem, a keyboard, a mouse, a touchscreen, or a similar device. In some examples, I/O controller 1315 may be implemented as part of a processor. In some examples, a user may interact with device 1305 via I/O controller 1315 or via hardware components controlled by I/O controller 1315.

Transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some examples the device may have more than one antenna 1325, which may be capable of concurrently transmitting or receiving multiple wireless transmissions.

Memory 1330 may include RAM and ROM. The memory 1330 may store computer-readable, computer-executable software 1335 including instructions that, when executed, cause the processor to perform various functions described herein. In some examples, the memory 1330 may contain, among other things, a basic input/output system (BIOS) which may control basic hardware or software operation such as the interaction with peripheral components or devices.

Processor 1340 may include an intelligent hardware device, (for example, a general-purpose processor, a digital signal processor (DSP), a CPU, a microcontroller, an ASIC, an FPGA, a programmable logic device, a discrete gate or transistor logic component, a discrete hardware component, or any combination thereof). In some examples, processor 1340 may be configured to operate a memory array using a memory controller. In other cases, a memory controller may be integrated into processor 1340. Processor 1340 may be configured to execute computer-readable instructions stored in a memory to perform various functions (for example, functions or tasks supporting techniques for controlling a network).

Figure 14:
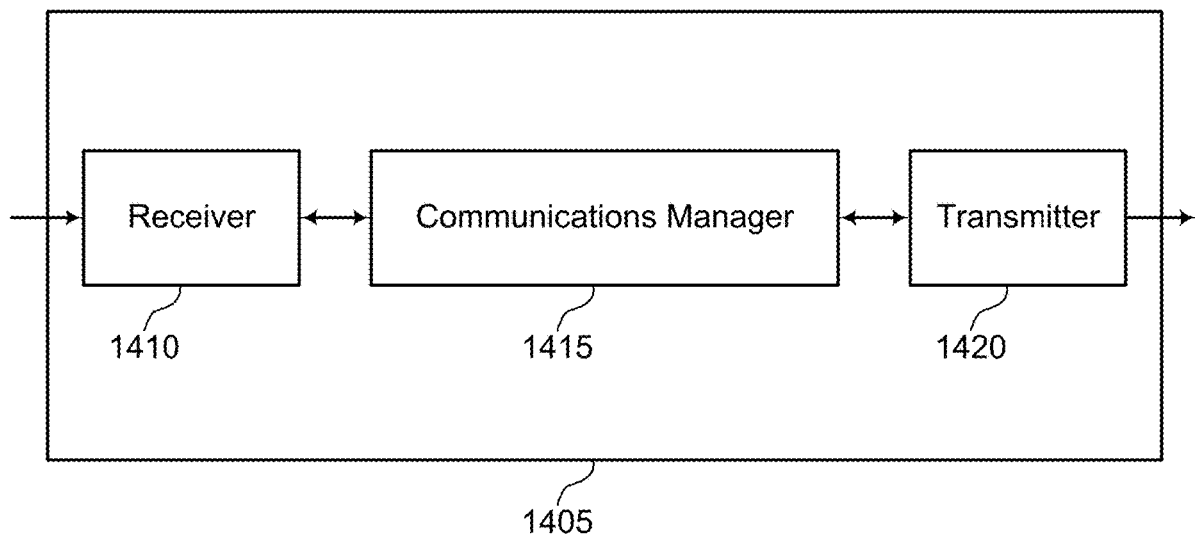
FIGS. 14 and 15 show block diagrams of devices for use in wireless communication.

FIG. 14 shows a block diagram of a device 1405 for use in wireless communication. The device 1405 may be an example of aspects of an AP as described herein. The device 1405 may include a receiver 1410, a communications manager 1415, and a transmitter 1420. The communications manager 1415 can be implemented, at least in part, by one or both of a modem and a processor. Each of these components may be in communication with one another (for example, via one or more buses).

The receiver 1410 may receive information such as packets, user data, or control information associated with various information channels (for example, but not limited to, control channels, data channels, and/or information related to techniques for controlling a network). Information may be passed on to other components of the device. The receiver 1410 may be an example of aspects of the transceiver 1720 described with reference to FIG. 17. The receiver 1410 may utilize a set of antennas.

The communications manager 1415 may identify information about an access point, transmit the information to a controller configured to control a set of access points that include the access point, receive at least one message from the controller that includes time intervals for the access point to communicate with a group of stations and one or more transmission parameters associated with each time interval, the one or more transmission parameters defining, for the respective time interval, one or more operations that the access point is permitted to perform during the respective time interval, and perform at least one of the one or more operations during at least one time interval of the time intervals. In some examples, the communications manager 1415 may communicate with the group of stations during at least one time interval of the time intervals using the respective one or more transmission parameters.

The communications manager 1415, or its sub-components, may be physically located at different locations, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a set of antennas.

Figure 15:
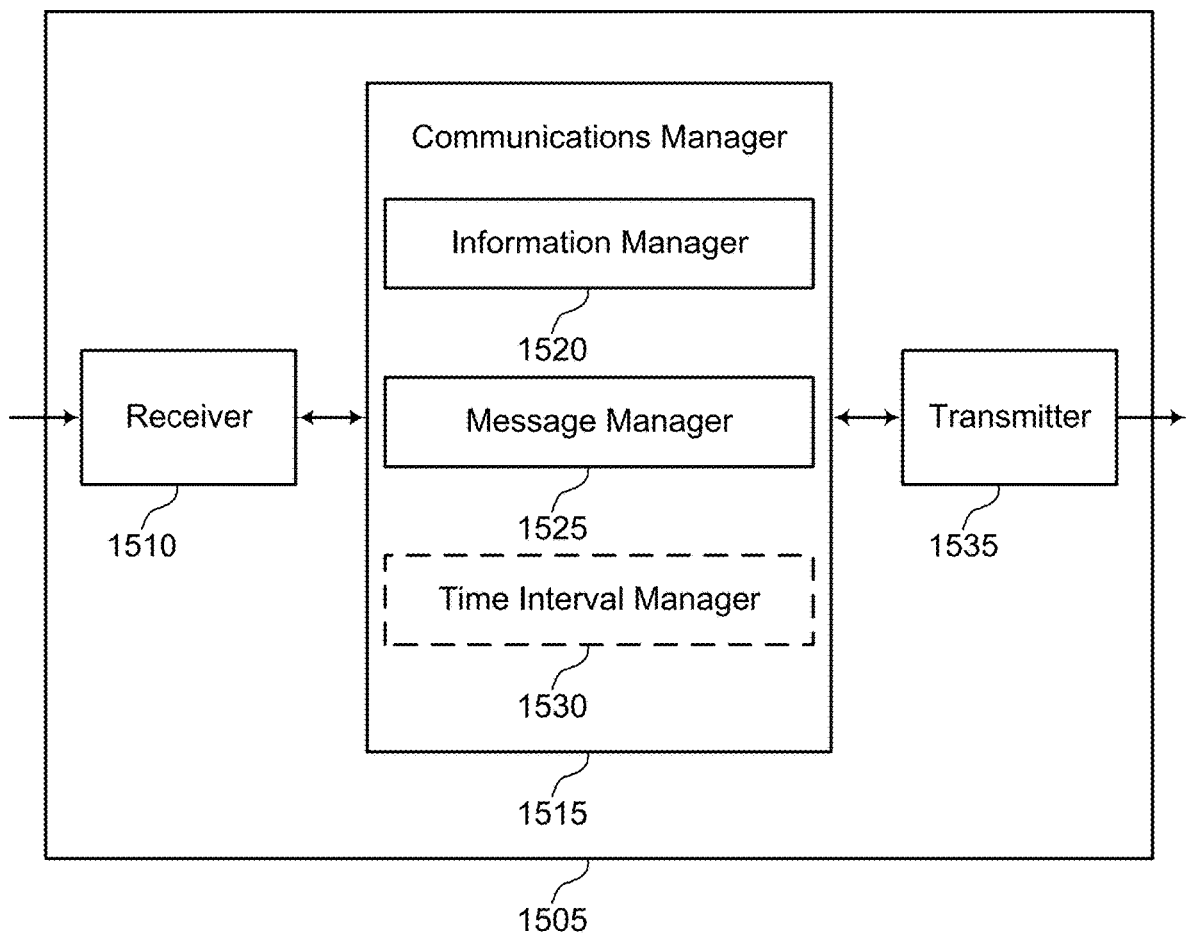

FIG. 15 shows a block diagram of a device 1505 for use in wireless communication. The device 1505 may be an example of aspects of a device 1405 or an AP 105 as described herein. The device 1505 may include a receiver 1510, a communications manager 1515, and a transmitter 1535. The communications manager 1515 can be implemented, at least in part, by one or both of a modem and a processor. Each of these components may be in communication with one another (for example, via one or more buses).

The receiver 1510 may receive information such as packets, user data, or control information associated with various information channels (for example, but not limited to, control channels, data channels, and/or information related to techniques for controlling a network). Information may be passed on to other components of the device. The receiver 1510 may be an example of aspects of the transceiver 1720 described with reference to FIG. 17. The receiver 1510 may utilize a set of antennas.

The communications manager 1515 may include an information manager 1520, a message manager 1525, and a time interval manager 1530. The information manager 1520 may identify information about an access point and transmit the information to a controller configured to control a set of access points that include the access point.

The message manager 1525 may receive at least one message from the controller that includes one or more transmission parameters defining one or more operations that at least one of the access points is permitted to perform, and determine one or more transmission parameters for the information transmitted to the controller. Additionally or alternatively, the message manager 1525 may optionally receive at least one message from the controller that includes time intervals for the access point to communicate with a group of stations and one or more transmission parameters associated with each time interval, the one or more transmission parameters defining, for the respective time interval, one or more operations that the access point is permitted to perform during the respective time interval.

The time interval manager 1530 may optionally perform at least one of the one or more operations during at least one time interval of the time intervals. The time interval manager 1530 may communicate with the group of stations during at least one time interval of the time intervals using the respective one or more transmission parameters.

The transmitter 1535 may transmit signals generated by other components of the device. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a set of antennas.

Figure 16:
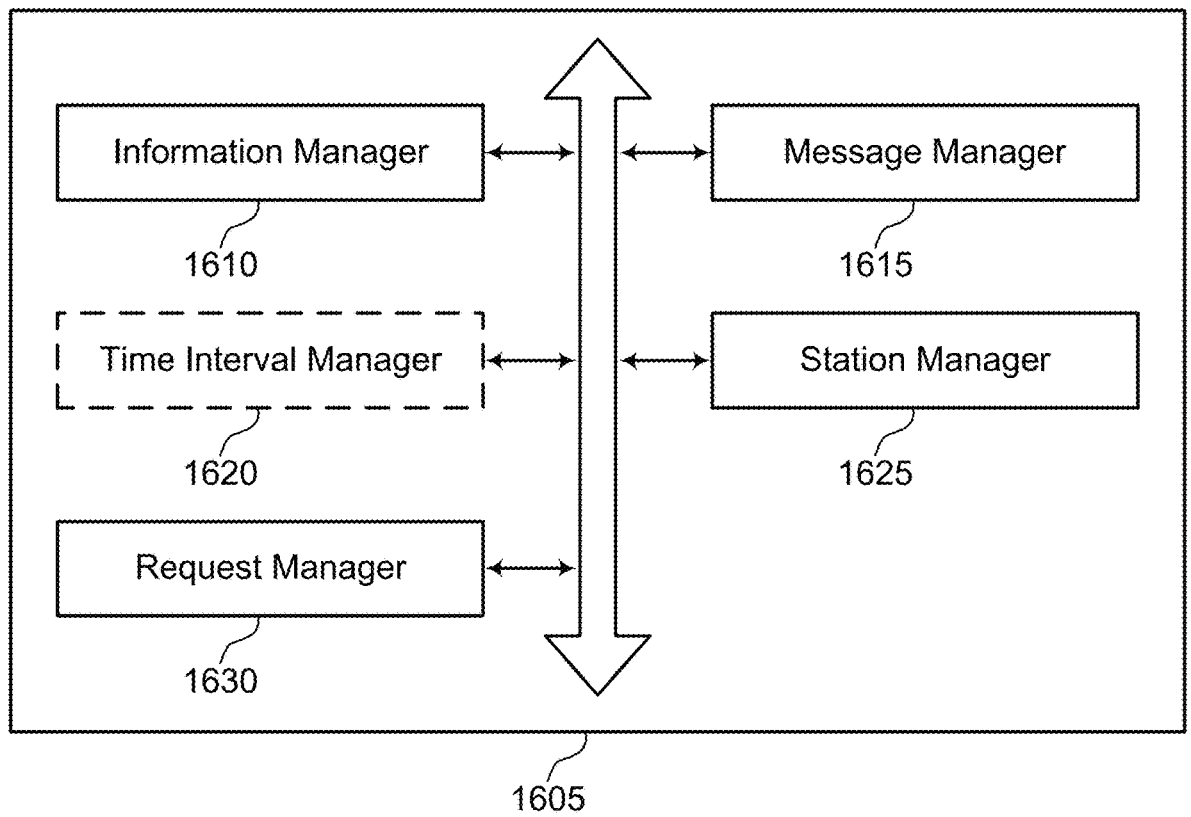
FIG. 16 shows a block diagram of a communications manager for use in wireless communication.

FIG. 16 shows a block diagram of a communications manager 1605 for use in wireless communication. The communications manager 1605 may include an information manager 1610, a message manager 1615, a time interval manager 1620, a station manager 1625, and a request manager 1630. Each of these modules may communicate, directly or indirectly, with one another (for example, via one or more buses).

The information manager 1610 may identify information an access point. In some examples, the information manager 1610 may transmit the information to a controller configured to control a set of access points that include the access point. In some examples, identifying statistics about stations that have an established communication link with the access point, where the information transmitted to the controller includes the statistics. In some examples, identifying statistics about stations that do not have an established communication link with the access point, where the information transmitted to the controller includes the statistics.

In some examples, identifying statistics about other access points, where the information transmitted to the controller includes the statistics about the other access points. In some examples, the information transmitted to the controller includes statistics about a first group of stations associated with the access point and a second group of stations that are not associated with the access point. In some examples, the information transmitted to the controller includes an indicator of traffic pending for at least one station of the group of stations.

In some examples, the information transmitted to the controller includes one or more of a list of stations tracked by the access point, a signal quality indicator associated with a communication link between the access point and a station, a beacon report about beacons received from other access points, client statistics, BSS statistics, or a power state of the station. In some examples, the one or more transmission parameters include one or more of instructions to the access point to cause the access point to communicate with stations associated with the access point, a modification to a schedule associated with the access point, a request-to-send configuration, a clear-to-send configuration, or an indication of a rate adaptation configuration.

The message manager 1615 may receive at least one message from the controller that includes time intervals for the access point to communicate with a group of stations and one or more transmission parameters associated with each time interval, the one or more transmission parameters defining, for the respective time interval, one or more operations that the access point is permitted to perform during the respective time interval. In some examples, the message manager 1615 may transmit downlink signals to the group of stations during the at least one time interval. In some examples, the message manager 1615 may receive uplink signals from the group of stations during the at least one time interval. In some examples, the access point includes at least a portion of the controller.

The time interval manager 1620 may optionally perform at least one of the one or more operations during at least one time interval of the time intervals. The time interval manager 1620 may communicate with the group of stations during at least one time interval of the time intervals using the respective one or more transmission parameters. The time interval manager 1620 may communicate with at least one state of the group of stations based on the respective one or more transmission parameters.

The station manager 1625 may determine identifiers of stations that the access point is permitted to communicate with during the at least one time interval based on receiving the at least one message, where communicating with the group of stations during the at least one time interval is based on the identifiers. In some examples, the group of stations includes stations that have an established communication link with the access point, where the access point is permitted to communicate with the stations during the at least one time interval.

The request manager 1630 may receive at least one request to collect the information about the access point, where identifying the information is based on receiving the at least one request.

Figure 17:
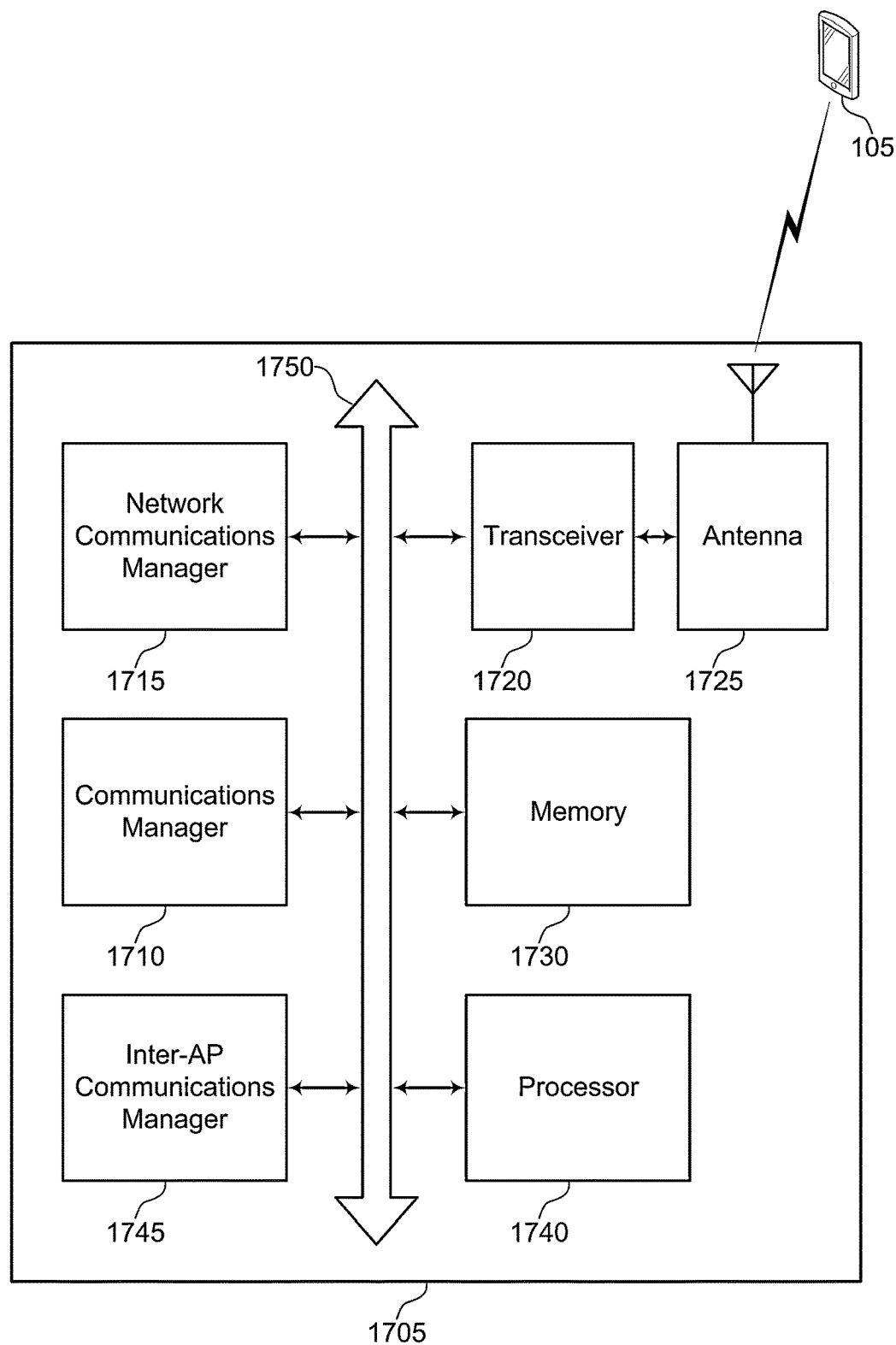
FIG. 17 shows a diagram of a system including a device for use in wireless communication.

FIG. 17 shows a diagram of a system including a device 1705 for use in wireless communication. The device 1705 may be an example of or include the components of device 1405, device 1505, or an AP as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-AP communications manager 1745. These components may be in electronic communication via one or more buses (for example, bus 1750).

The communications manager 1710 may identify information about an access point, transmit the information to a controller configured to control a set of access points that include the access point, receive at least one message from the controller that includes time intervals for the access point to communicate with a group of stations and one or more transmission parameters associated with each time interval, the one or more transmission parameters defining, for the respective time interval, one or more operations that the access point is permitted to perform during the respective time interval, and communicate with the group of stations during at least one time interval of the time intervals using the respective one or more transmission parameters.

The network communications manager 1715 may manage communications with the core network (for example, via one or more wired backhaul links). For example, the network communications manager 1715 may manage the transfer of data communications for client devices, such as one or more STAs 115.

The transceiver 1720 may communicate bi-directionally, via one or more antennas, wired, or wireless links as described herein. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some examples, the wireless device may include a single antenna 1725. However, in some examples the device may have more than one antenna 1725, which may be capable of concurrently transmitting or receiving multiple wireless transmissions.

The memory 1730 may include RAM and ROM. The memory 1730 may store computer-readable, computer-executable code 1735 including instructions that, when executed, cause the processor to perform various functions described herein. In some examples, the memory 1730 may contain, among other things, a BIOS which may control basic hardware or software operation such as the interaction with peripheral components or devices.

The processor 1740 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1740 may be configured to operate a memory array using a memory controller. In other cases, a memory controller may be integrated into processor 1740. The processor 1740 may be configured to execute computer-readable instructions stored in a memory to perform various functions (for example, functions or tasks supporting techniques for controlling a network).

The inter-AP communications manager 1745 may manage communications with other AP 105, and may include a controller or scheduler for controlling communications with STAs 115 in cooperation with other APs 105. For example, the inter-AP communications manager 1745 may coordinate scheduling for transmissions to STAs 115 for various interference mitigation techniques such as beamforming or joint transmission.

Figure 18:
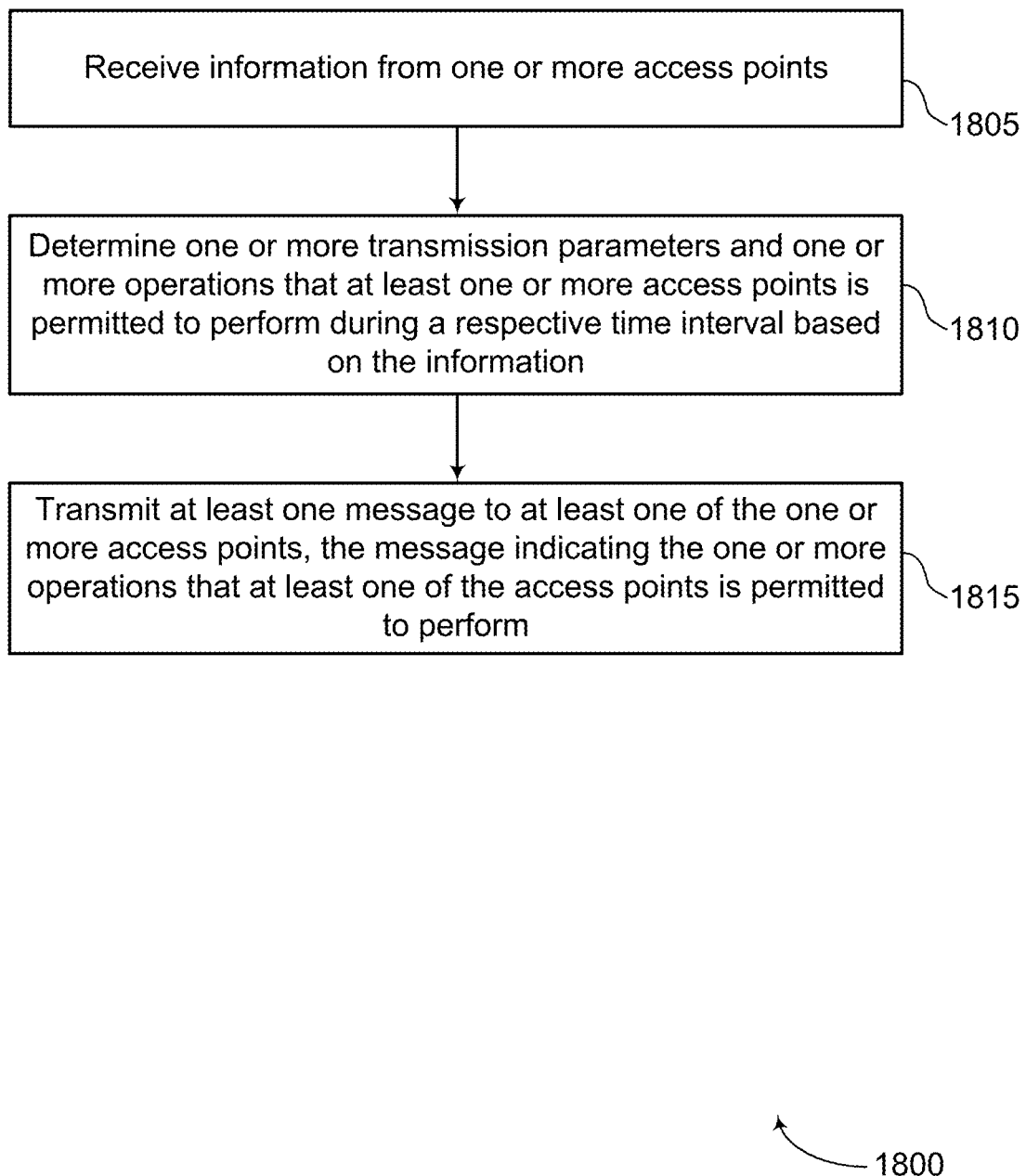
FIGS. 18-22 show flowcharts illustrating methods for use in wireless communication.

FIG. 18 shows a flowchart illustrating a method 1800 for use in wireless communication. The operations of method 1800 may be implemented by a controller or its components as described herein. For example, the operations of method 1800 may be performed by a communications manager as described with reference to FIGS. 10-13. In some examples, a controller may execute a set of instructions to control the functional elements of the controller to perform the functions described herein. Additionally or alternatively, a controller may perform aspects of the functions described herein using special-purpose hardware.

At 1805, the controller may receive information from one or more access points. The operations of 1805 may be performed according to the methods described herein. In some examples, aspects of the operations of 1805 may be performed by an information manager as described with reference to FIGS. 10-13.

At 1810, the controller may determine one or more transmission parameters and one or more operations that at least one access point of the one or more access points is permitted to perform during a respective time interval based on the information. Additionally or alternatively at 1810, the controller may optionally determine one or more transmission parameters associated with each time interval, the one or more transmission parameters associated with each time interval defining, for the respective time interval, one or more operations that at least one of the one or more access points is permitted to perform during the respective time interval. The operations of 1810 may be performed according to the methods described herein. In some examples, aspects of the operations of 1810 may be performed by a transmission parameter manager as described with reference to FIGS. 10-13.

At 1815, the controller may transmit at least one message to at least one of the one or more access points, the message indicating the one or more operations that at least one of the access points is permitted to perform. Additionally or alternatively at 1815, the controller may optionally transmit at least one message to at least one of the one or more access points that includes the time intervals and the one or more transmission parameters associated with each time interval. The operations of 1815 may be performed according to the methods described herein. In some examples, aspects of the operations of 1815 may be performed by a message manager as described with reference to FIGS. 10-13.

Figure 19:
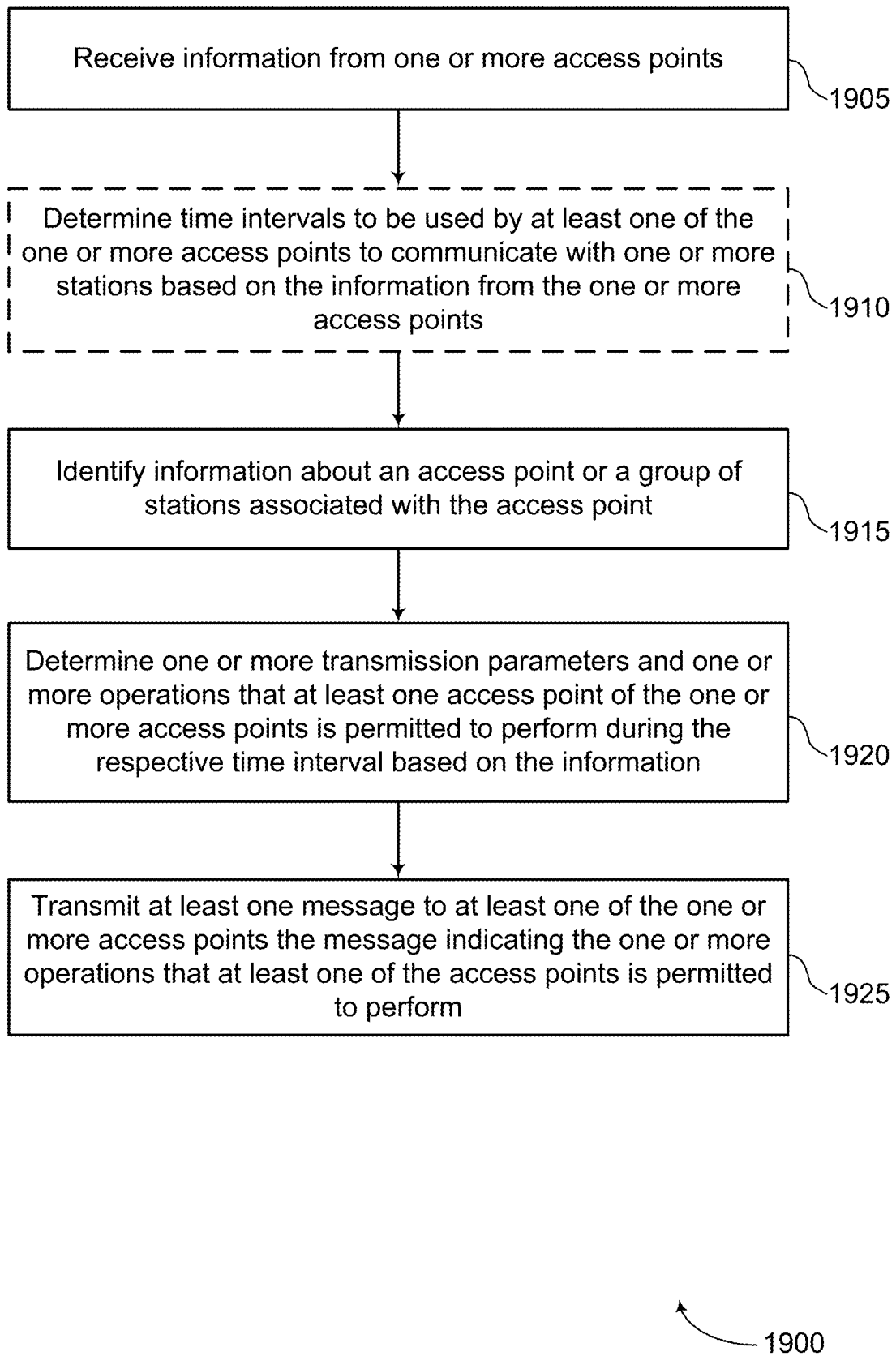

FIG. 19 shows a flowchart illustrating a method 1900 for use in wireless communication. The operations of method 1900 may be implemented by a controller or its components as described herein. For example, the operations of method 1900 may be performed by a communications manager as described with reference to FIGS. 10-13. In some examples, a controller may execute a set of instructions to control the functional elements of the controller to perform the functions described herein. Additionally or alternatively, a controller may perform aspects of the functions described herein using special-purpose hardware.

At 1905, the controller may receive information from one or more access points. The operations of 1905 may be performed according to the methods described herein. In some examples, aspects of the operations of 1905 may be performed by an information manager as described with reference to FIGS. 10-13.

At 1910, the controller may optionally determine time intervals to be used by at least one of the one or more access points to communicate with one or more stations based on the information from the one or more access points. The operations of 1910 may be performed according to the methods described herein. In some examples, aspects of the operations of 1910 may optionally be performed by a time interval manager as described with reference to FIGS. 10-13.

At 1915, the controller may identify information about an access point or a group of stations associated with the access point. Additionally or alternatively at 1915, the controller may optionally identify, for at least one of the time intervals, a device to communicate with a first access point of the one or more access points during the time interval, where the one or more transmission parameters indicate that the first access point is permitted to communicate with the station during the time interval. The operations of 1915 may be performed according to the methods described herein. In some examples, aspects of the operations of 1915 may be performed by a station manager as described with reference to FIGS. 10-13.

At 1920, the controller may determine one or more transmission parameters and one or more operations that at least one access point of the one or more access points is permitted to perform during the respective time interval based on the information. Additionally or alternatively at 1920, the controller may optionally determine one or more transmission parameters associated with each time interval, the one or more transmission parameters associated with each time interval defining, for the respective time interval, one or more operations that at least one of the one or more access points is permitted to perform during the respective time interval. The operations of 1920 may be performed according to the methods described herein. In some examples, aspects of the operations of 1920 may be performed by a transmission parameter manager as described with reference to FIGS. 10-13.

At 1925, the controller may transmit at least one message to at least one of the one or more access points the message indicating the one or more operations that at least one of the access points is permitted to perform. Additionally or alternatively at 1925, the controller may optionally transmit at least one message to at least one of the one or more access points that includes the time intervals and the one or more transmission parameters associated with each time interval. The operations of 1925 may be performed according to the methods described herein. In some examples, aspects of the operations of 1925 may be performed by a message manager as described with reference to FIGS. 10-13.

Figure 20:
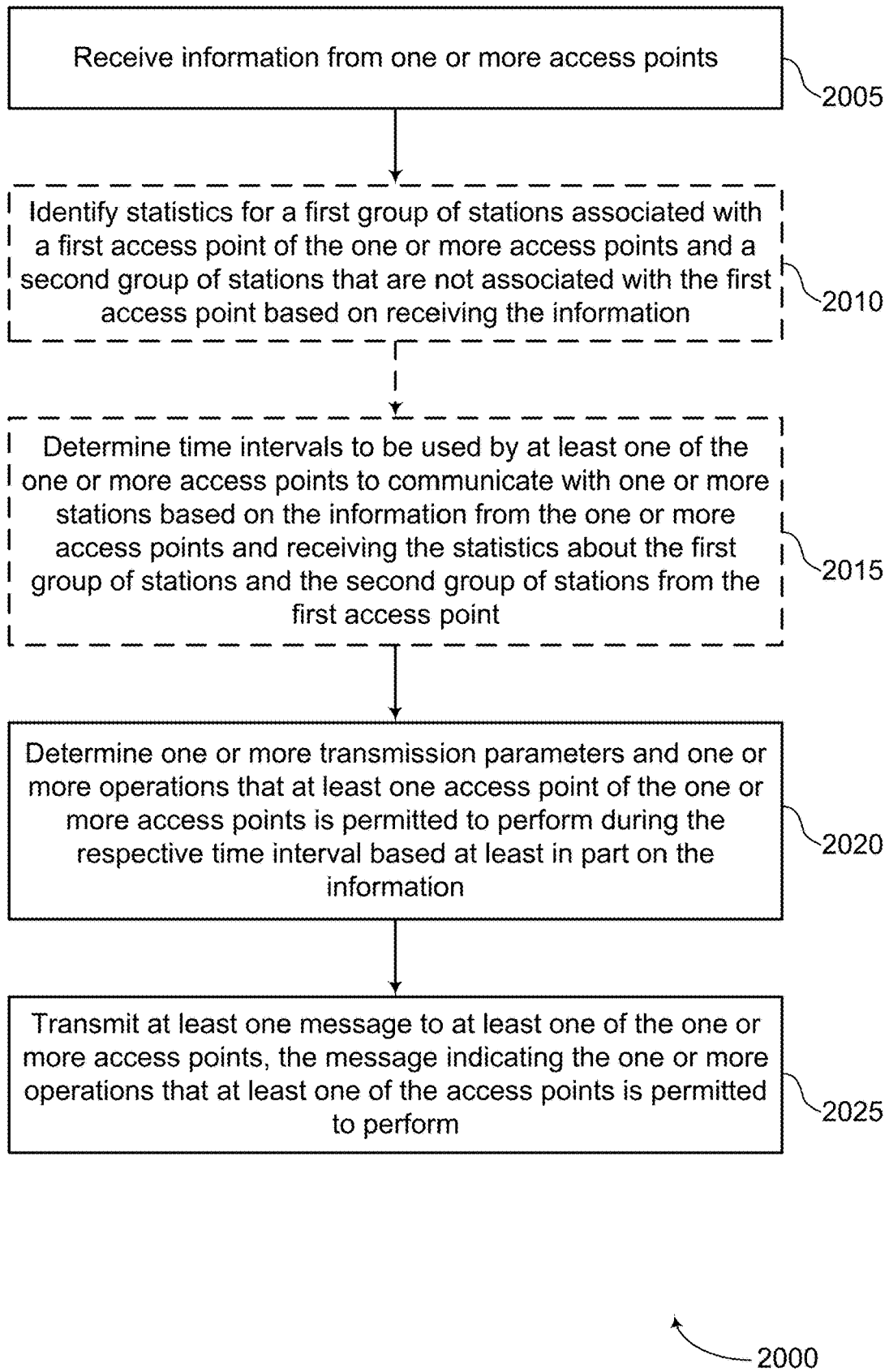

FIG. 20 shows a flowchart illustrating a method 2000 for use in wireless communication. The operations of method 2000 may be implemented by a controller or its components as described herein. For example, the operations of method 2000 may be performed by a communications manager as described with reference to FIGS. 10-13. In some examples, a controller may execute a set of instructions to control the functional elements of the controller to perform the functions described herein. Additionally or alternatively, a controller may perform aspects of the functions described herein using special-purpose hardware.

At 2005, the controller may receive information from one or more access points. The operations of 2005 may be performed according to the methods described herein. In some examples, aspects of the operations of 2005 may be performed by an information manager as described with reference to FIGS. 10-13.

At 2010, the controller may optionally identify statistics for a first group of stations associated with a first access point of the one or more access points and a second group of stations that are not associated with the first access point based on receiving the information. The operations of 2010 may be performed according to the methods described herein. In some examples, aspects of the operations of 2010 may optionally be performed by a communication link manager as described with reference to FIGS. 10-13.

At 2015, the controller may optionally determine time intervals to be used by at least one of the one or more access points to communicate with one or more stations based on the information from the one or more access points and receiving the statistics about the first group of stations and the second group of stations from the first access point. The operations of 2015 may be performed according to the methods described herein. In some examples, aspects of the operations of 2015 may optionally be performed by a time interval manager as described with reference to FIGS. 10-13.

At 2020, the controller may determine one or more transmission parameters and one or more operations that at least one access point of the one or more access points is permitted to perform during the respective time interval based at least in part on the information. Additionally or alternatively at 2020, the controller may optionally determine one or more transmission parameters associated with each time interval, the one or more transmission parameters associated with each time interval defining, for the respective time interval, one or more operations that at least one of the one or more access points is permitted to perform during the respective time interval. The operations of 2020 may be performed according to the methods described herein. In some examples, aspects of the operations of 2020 may be performed by a transmission parameter manager as described with reference to FIGS. 10-13.

At 2025, the controller may transmit at least one message to at least one of the one or more access points, the message indicating the one or more operations that at least one of the access points is permitted to perform. Additionally or alternatively at 2025, the controller may optionally transmit at least one message to at least one of the one or more access points that includes the time intervals and the one or more transmission parameters associated with each time interval. The operations of 2025 may be performed according to the methods described herein. In some examples, aspects of the operations of 2025 may be performed by a message manager as described with reference to FIGS. 10-13.

Figure 21:
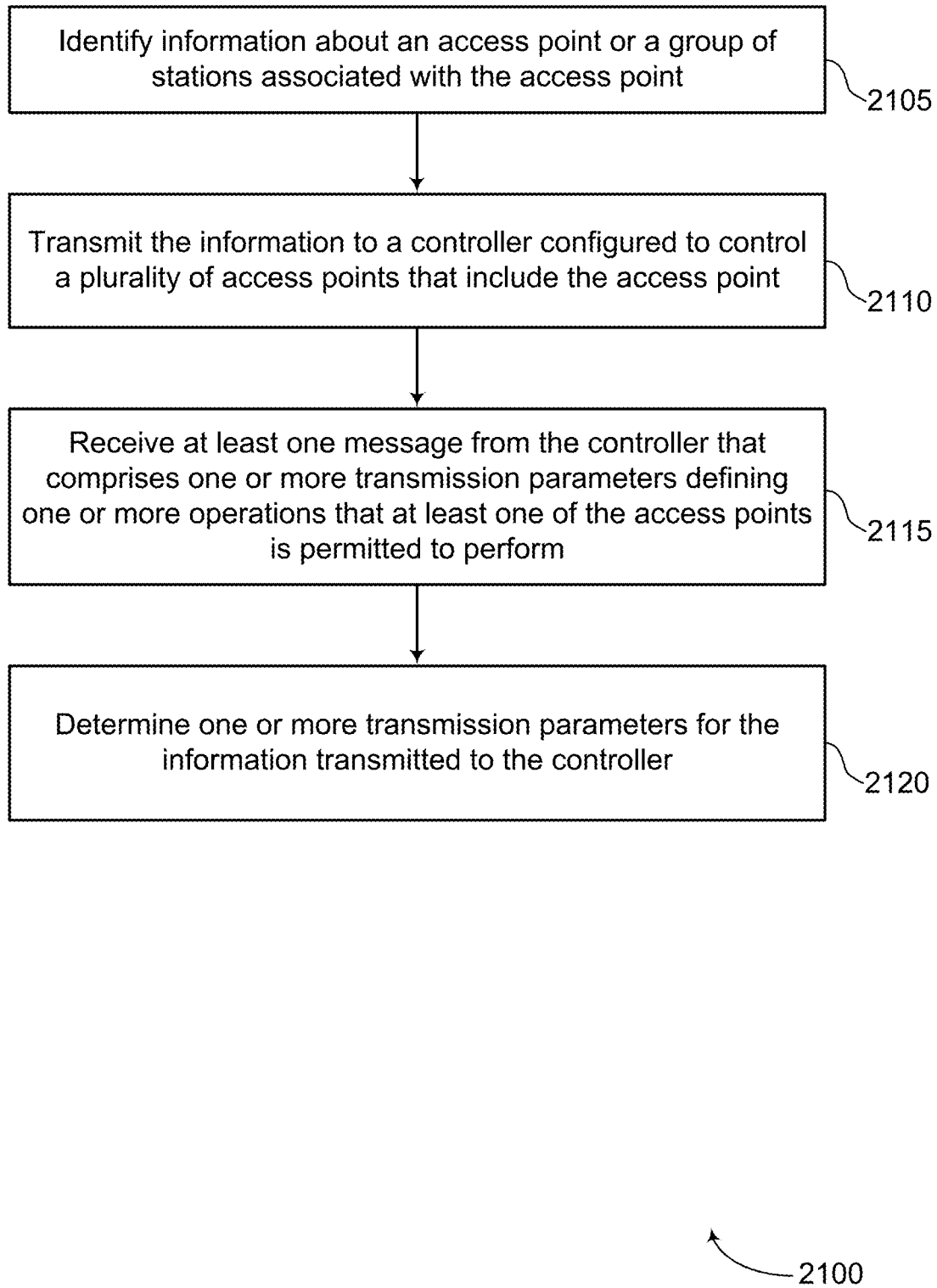

FIG. 21 shows a flowchart illustrating a method 2100 for use in wireless communication. The operations of method 2100 may be implemented by an AP or its components as described herein. For example, the operations of method 2100 may be performed by a communications manager as described with reference to FIGS. 14-17. In some examples, an AP may execute a set of instructions to control the functional elements of the AP to perform the functions described herein. Additionally or alternatively, an AP may perform aspects of the functions described herein using special-purpose hardware.

At 2105, the AP may identify information about an access point or a group of stations associated with the access point. The operations of 2105 may be performed according to the methods described herein. In some examples, aspects of the operations of 2105 may be performed by an information manager as described with reference to FIGS. 14-17.

At 2110, the AP may transmit the information to a controller configured to control multiple access points that include the access point. The operations of 2110 may be performed according to the methods described herein. In some examples, aspects of the operations of 2110 may be performed by an information manager as described with reference to FIGS. 14-17.

At 2115, the AP may receive at least one message from the controller that includes one or more transmission parameters defining one or more operations that at least one of the access points is permitted to perform. Additionally or alternatively at 2115, the AP may optionally receive at least one message from the controller that includes time intervals for the access point to communicate with the group of stations and one or more transmission parameters associated with each time interval, the one or more transmission parameters defining, for the respective time interval, one or more operations that the access point is permitted to perform during the respective time interval. The operations of 2115 may be performed according to the methods described herein. In some examples, aspects of the operations of 2115 may be performed by a message manager as described with reference to FIGS. 14-17.

At 2120, the AP may determine one or more transmission parameters for the information transmitted to the controller Additionally or alternatively at 2120, the AP may perform at least one of the one or more operations during at least one time interval of the time intervals. The operations of 2120 may be performed according to the methods described herein. In some examples, aspects of the operations of 2120 may be performed by a time interval manager as described with reference to FIGS. 14-17.

Figure 22:
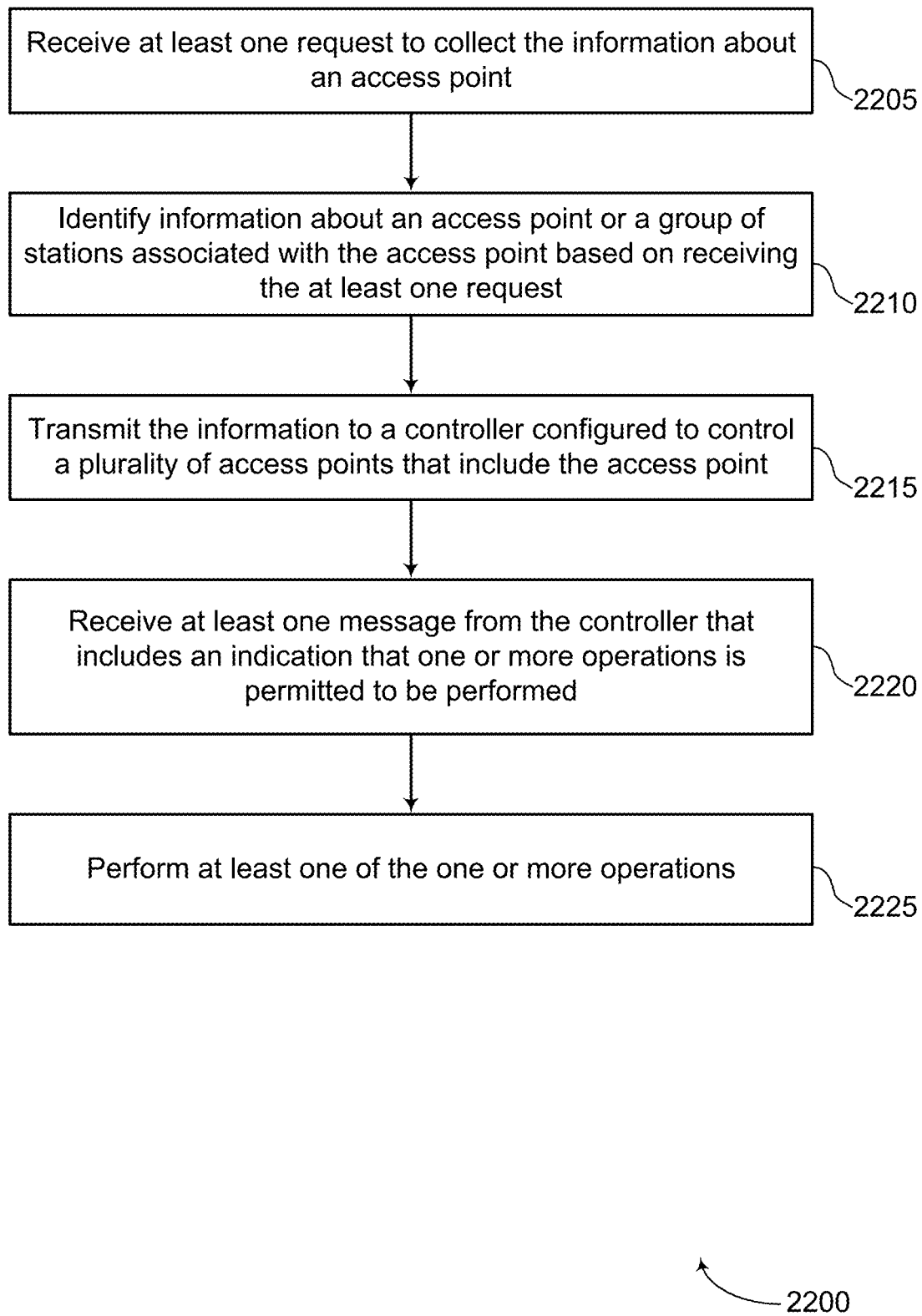

FIG. 22 shows a flowchart illustrating a method 2200 for use in wireless communication. The operations of method 2200 may be implemented by an AP or its components as described herein. For example, the operations of method 2200 may be performed by a communications manager as described with reference to FIGS. 14-17. In some examples, an AP may execute a set of instructions to control the functional elements of the AP to perform the functions described herein. Additionally or alternatively, an AP may perform aspects of the functions described herein using special-purpose hardware.

At 2205, the AP may receive at least one request to collect the information about the access point or a group of stations associated with the access point. The operations of 2205 may be performed according to the methods described herein. In some examples, aspects of the operations of 2205 may be performed by a request manager as described with reference to FIGS. 14-17.

At 2210, the AP may identify information about the access point based on receiving the at least one request. The operations of 2210 may be performed according to the methods described herein. In some examples, aspects of the operations of 2210 may be performed by an information manager as described with reference to FIGS. 14-17.

At 2215, the AP may transmit the information to a controller configured to control multiple access points that include the access point. The operations of 2215 may be performed according to the methods described herein. In some examples, aspects of the operations of 2215 may be performed by an information manager as described with reference to FIGS. 14-17.

At 2220, the AP may receive at least one message from the controller that includes an indication that one or more operations is permitted to be performed. Additionally or alternatively at 2220, the AP may optionally receive at least one message from the controller that includes time intervals for the access point to communicate with the group of stations and one or more transmission parameters associated with each time interval, the one or more transmission parameters defining, for the respective time interval, one or more operations that the access point is permitted to perform during the respective time interval. The operations of 2220 may be performed according to the methods described herein. In some examples, aspects of the operations of 2220 may be performed by a message manager as described with reference to FIGS. 14-17.

At 2225, the AP may perform at least one of the one or more operations. Additionally or alternatively at 2225, the AP may optionally perform at least one of the one or more operations during at least one time interval of the time intervals. The operations of 2225 may be performed according to the methods described herein. In some examples, aspects of the operations of 2225 may be performed by a time interval manager as described with reference to FIGS. 14-17.

It should be noted that the methods described herein describe possible implementations, and that the operations and the steps may be rearranged or otherwise modified and that other implementations are possible. Furthermore, aspects from two or more of the methods may be combined.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a DSP, an ASIC, an FPGA or other PLD, discrete gate or transistor logic, discrete hardware components, or any combination thereof designed to perform the functions described herein. A general purpose processor may be a microprocessor, or, any processor, controller, microcontroller, or state machine. A processor also may be implemented as a combination of computing devices, for example, a combination of a DSP and a microprocessor, a set of microprocessors, one or more microprocessors in conjunction with a DSP core, or any other such configuration. In some implementations, particular processes, operations and methods may be performed by circuitry that is specific to a given function.

As described herein, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can In some examples be excised from the combination, and the claimed combination may be directed to a subcombination or variation of a subcombination.

Similarly, while operations are depicted in the drawings in a particular order, this should not be interpreted as requiring that such operations be performed in the particular order shown or in sequential order, or that all illustrated operations be performed, to achieve desirable results. Further, the drawings may schematically depict additional example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be interpreted as requiring such separation in all implementations. Furthermore, the described program components and systems can generally be integrated together in a single software product or packaged into multiple software products.

What is claimed is:

1. A method for wireless communication, comprising:
   receiving information from one or more access points (APs), the information comprising statistics for a first group of stations (STAs) associated with a first AP of the one or more APs and a second group of STAs that are not associated with the first AP; and
   transmitting, in accordance with the information, at least one permitted operation message to at least one of the one or more APs, the at least one permitted operation message including one or more transmission parameters indicating one or more operations that the at least one of the one or more APs is permitted to perform during a respective time interval.

2. The method of claim 1, wherein a transmission parameter of the one or more transmission parameters includes an indicator of one or more STAs that each of the at least one of the one or more APs is permitted to communicate with during the respective time interval.

3. The method of claim 1, wherein a transmission parameter of the one or more transmission parameters indicates that the at least one of the one or more APs is to select one or more STAs to communicate with during the respective time interval.

4. The method of claim 1, wherein a transmission parameter of the one or more transmission parameters indicates that the at least one of the one or more APs is to be silent during the respective time interval.

5. The method of claim 1, wherein a transmission parameter of the one or more transmission parameters indicates that the first AP of the one or more APs is permitted to communicate with each STA of the first group of STAs associated with the first AP during the respective time interval.

6. The method of claim 1, further comprising transmitting at least one request to at least one of the one or more APs to collect the information, wherein the information is received in accordance with the at least one request.

7. The method of claim 1, wherein the information received from the one or more APs comprises at least one of statistics about communication links between at least some of the one or more APs and one or more STAs, association and capabilities information per associated STA, an amount of pending traffic for at least one STA of the one or more STAs per quality of service (QoS) category, an amount of pending traffic for at least one STA of the one or more STAs per access category (AC), an amount of pending traffic for at least one STA of the one or more STAs per traffic identifier (TID), one or more signal quality indicators associated with a communication link between the first AP and a STA, a beacon report about beacons received from other APs, and a power state of a STA.

8. A method for wireless communication, comprising:
   transmitting information about an access point (AP) or a group of stations (STAs) associated with the AP to a controller configured to control a plurality of APs that includes the AP, the information comprising statistics about a first group of STAs associated with the AP and a second group of STAs that are not associated with the AP; and
   receiving, in accordance with the information, at least one permitted operation message from the controller that comprises one or more transmission parameters defining one or more operations that at least one of the plurality of APs is permitted to perform during a respective time interval.

9. The method of claim 8, wherein a transmission parameter of the one or more transmission parameters includes an indicator of one or more STAs that the AP is permitted to communicate with during the respective time interval.

10. The method of claim 8, wherein a transmission parameter of the one or more transmission parameters indicates that the AP is to select one or more STAs to communicate with during the respective time interval.

11. The method of claim 8, wherein a transmission parameter of the one or more transmission parameters indicates that the AP is to be silent during the respective time interval.

12. The method of claim 8, wherein a transmission parameter of the one or more transmission parameters indicates that the AP is permitted to communicate with each STA of the first group of STAs associated with the AP during the respective time interval.

13. The method of claim 8, further comprising identifying statistics about STAs that have an established communication link with the AP, wherein the information transmitted to the controller comprises the statistics.

14. The method of claim 8, further comprising identifying statistics about STAs that do not have an established communication link with the AP, wherein the information transmitted to the controller comprises the statistics.

15. The method of claim 8, further comprising identifying statistics about other APs, wherein the information transmitted to the controller comprises the statistics about the other APs.

16. An apparatus for wireless communication, comprising:
one or more memories; and
one or more processors coupled to the one or more memories, the one or more processors individually or collectively configured to:
obtain information from one or more access points (APs), the information comprising statistics for a first group of stations (STAs) associated with a first AP of the one or more APs and a second group of STAs that are not associated with the first AP; and
output, in accordance with the information, at least one permitted operation message to at least one of the one or more APs, the at least one permitted operation message including one or more transmission parameters indicating one or more operations that at least one of the one or more APs is permitted to perform during a respective time interval.

17. The apparatus of claim 16, wherein a transmission parameter of the one or more transmission parameters includes an indicator of one or more STAs that each of the at least one of the one or more APs is permitted to communicate with during the respective time interval.

18. The apparatus of claim 16, wherein a transmission parameter of the one or more transmission parameters indicates that the at least one of the one or more APs is to select one or more STAs to communicate with during the respective time interval.

19. The apparatus of claim 16, wherein a transmission parameter of the one or more transmission parameters indicates that the at least one of the one or more APs is to be silent during the respective time interval.

20. The apparatus of claim 16, wherein a transmission parameter of the one or more transmission parameters indicates that the first AP of the one or more APs is permitted to communicate with each STA of the first group of STAs associated with the first AP during the respective time interval.

21. The apparatus of claim 16, wherein the instructions are further executable by the processor to cause the apparatus to:
output at least one request to at least one of the one or more APs to collect the information, wherein the information is obtained in accordance with the at least one request.

22. The apparatus of claim 16, wherein the information received from the one or more APs comprises at least one of statistics about communication links between at least some of the one or more APs and one or more STAs, association and capabilities information per associated STA, an amount of pending traffic for at least one STA of the one or more STAs per quality of service (QoS) category, an amount of pending traffic for at least one STA of the one or more STAs per access category (AC), an amount of pending traffic for at least one STA of the one or more STAs per traffic identifier (TID), one or more signal quality indicators associated with a communication link between the first AP and a STA, a beacon report about beacons received from other APs, and a power state of a STA.

23. An apparatus for wireless communication, comprising:
one or more memories; and
one or more processors coupled to the one or more memories, the one or more processors individually or collectively configured to:
output information about an access point (AP) or a group of stations (STAs) associated with the AP to a controller configured to control a plurality of APs that include the AP, the information comprising statistics about a first group of STAs associated with the AP and a second group of STAs that are not associated with the AP; and
obtain, in accordance with the information, at least one permitted operation message from the controller that comprises one or more transmission parameters defining one or more operations that at least one of the plurality of APs is permitted to perform during a respective time interval.

24. The apparatus of claim 23, wherein a transmission parameter of the one or more transmission parameters includes an indicator of one or more STAs that the at least one of the plurality of APs is permitted to communicate with during the respective time interval.

25. The apparatus of claim 23, wherein a transmission parameter of the one or more transmission parameters indicates that the at least one of the plurality of APs is to select one or more STAs to communicate with during the respective time interval.

26. The apparatus of claim 23, wherein a transmission parameter of the one or more transmission parameters indicates that the at least one of the plurality of APs is to be silent during the respective time interval.

27. The apparatus of claim 23, wherein a transmission parameter of the one or more transmission parameters indicates that the at least one of the plurality of APs is permitted to communicate with each STA of the first group of STAs associated with the AP during the respective time interval.

28. The apparatus of claim 23, wherein the information output to the controller comprises statistics about STAs that have an established communication link with the AP.

29. The apparatus of claim 23, wherein the information output to the controller comprises statistics about STAs that do not have an established communication link with the AP.

30. The apparatus of claim 23, wherein the information output to the controller comprises statistics about other APs.

* * * * *